US012080247B2

(12) United States Patent
Dai

(10) Patent No.: US 12,080,247 B2
(45) Date of Patent: Sep. 3, 2024

(54) METHOD FOR TRANSMITTING DATAELECTRONIC DEVICE AND NON-TRANSITORY COMPUTER-READABLE MEDIUM

(71) Applicant: WUHAN TIANMA MICRO-ELECTRONICS CO., LTD., Wuhan (CN)

(72) Inventor: Wenbin Dai, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 18/333,032

(22) Filed: Jun. 12, 2023

(65) Prior Publication Data

US 2023/0326414 A1 Oct. 12, 2023

(30) Foreign Application Priority Data

Feb. 6, 2023 (CN) ......................... 202310099898.1

(51) Int. Cl.
*G09G 3/3266* (2016.01)

(52) U.S. Cl.
CPC .................................. *G09G 3/3266* (2013.01)

(58) Field of Classification Search
CPC ................... G09G 3/3266; G09G 3/20; G09G 2300/0426; G09G 2320/0223; G09G 2310/0275; H10K 59/131; H10K 59/121; H10K 59/88; H10K 59/352; H10K 59/353; H10K 59/122; H10K 59/123; H10K 59/1315; H10K 50/80; H10K 59/35
See application file for complete search history.

(56) References Cited

U.S. PATENT DOCUMENTS

2020/0394967 A1* 12/2020 Park ...................... G06F 1/1626
2021/0343211 A1* 11/2021 Liu ....................... G06F 3/1438
2024/0127734 A1* 4/2024 Su ........................ G09G 3/3275

FOREIGN PATENT DOCUMENTS

CN 113345934 A 9/2021
CN 114093275 A 2/2022

* cited by examiner

*Primary Examiner* — Md Saiful A Siddiqui
(74) *Attorney, Agent, or Firm* — CHRISTENSEN O'CONNOR JOHNSON KINDNESS PLLC

(57) ABSTRACT

Provided are a method for transmitting data, an electronic device, and a non-transitory computer-readable medium. The method includes determining whether a serial number of a data line corresponding to the current channel datum is a staring serial number of a first predetermined serial number range, when yes, mapping a staring serial number or an ending serial number of a first mapping range as the serial number of the data line corresponding to the current channel datum, and resetting a counting value; and determining whether the serial number of the data line corresponding to the current channel datum is not the starting serial number of the first predetermined serial number range, and when yes, increasing a current counting value by 1 within a first counting range, determining a current serial number step, and mapping a sum of the current serial number step and another serial number as the serial number.

18 Claims, 12 Drawing Sheets

METHOD FOR TRANSMITTING DATAELECTRONIC DEVICE AND NON-TRANSITORY COMPUTER-READABLE MEDIUM

CROSS-REFERENCE TO RELATED APPLICATIONS

The present application claims priority to Chinese Patent Application No. 202310099898.1, filed on Feb. 6, 2023, the content of which is incorporated herein by reference in its entirety.

TECHNICAL FIELD

The present disclosure relates to the technical field of display, and in particular, to a method for transmitting data, an electronic device, and a non-transitory computer-readable medium.

BACKGROUND

As shown in FIG. 1, a display panel in the related art includes multiple data lines including data lines a1 to a8 sequentially arranged from left to right. The data lines are connected to a driving chip below the display panel. During the display process, the driving chip is configured to transmit a corresponding channel datum to each data line, so as to drive the display panel to display a corresponding image. In theory, the data lines of the display panel are connected to data pins of the driving chip in a same arrangement order. For example, the data lines a1 to a8 that are sequentially arranged from left to right should be sequentially connected to the data pins b1 to b8 that are sequentially arranged from left to right. However, due to the edge of the display panel in the related art having a rounded angle (an arc angle) or other reasons, at least one data line is extended from the edge region to the middle region and then be connected to at least one data pin. As a result, the arrangement sequence of the data lines is not consistent with the arrangement sequence of the data pins of the driving chip, and thus the driving chip needs to be provided with a large storage space for storing the corresponding relationship between the data lines and the data pins.

SUMMARY

In a first aspect, a method for transmitting data is provided. The method for transmitting data includes: sequentially determining serial numbers of data pins corresponding to a plurality of channel data; and transmitting the plurality of channel data based on the serial numbers of the data pins corresponding to the plurality of channel data. A process of determining one serial number of the serial numbers of one data pin of the data pins corresponding to a current channel datum of the plurality of channel data includes: determining whether a serial number of a data line corresponding to the current channel datum is a staring serial number of a first predetermined serial number range; and when the serial number of the data line corresponding to the current channel datum is the staring serial number, mapping one of a staring serial number and an ending serial number of a first mapping range as the serial number of the data line corresponding to the current channel datum, and resetting a counting value; determining whether the serial number of the data line corresponding to the current channel datum is one of non-starting serial numbers of the first predetermined serial number range; and when the serial number of the data line corresponding to the current channel datum is one of non-starting serial numbers of the first predetermined serial number range, increasing a current counting value by 1 within a first counting range, determining a current serial number step based on the current counting value, and mapping a sum of the current serial number step and another serial number of the serial numbers of another data pin of the data pins that corresponds to a previous channel datum previous to the current channel datum as the serial number of the data pin corresponding to the current channel datum; determining whether the serial number of the data line corresponding to the current channel datum is a starting serial number of a second predetermined serial number range, when the serial number of the data line corresponding to the current channel datum is the starting serial number of the second predetermined serial number range, mapping a starting serial number of a second mapping range as the serial number of the data pin corresponding to the current channel datum, and resetting the counting value; and determining whether the serial number of the data line corresponding to the current channel datum is one of non-starting serial numbers of the second predetermined serial number range; and when the serial number of the data line corresponding to the current channel datum is one of non-starting serial numbers of the second predetermined serial number range, increasing the counting value by 1 within a second counting range, determining the current serial number step based on the current counting value, and mapping a sum of the current serial number step and the serial number of the data pin corresponding to the previous channel datum as the serial number of the data pin corresponding to the current channel datum.

In a second aspect, an electronic device is provided. The electronic device includes: a display panel, a processor including data pins sequentially arranged, and a memory configured to store at least one instruction. The at least one instruction, when loaded and executed by the processor, causes the processor to perform a method for transmitting data. The display panel includes a plurality of first data lines sequentially arranged in a first region and a plurality of second data lines sequentially arranged in a second region. The plurality of first data lines is connected to a plurality of first data pins of the data pins, respectively. The plurality of second data lines is connected to a plurality of second data pins of the data pins, respectively. The plurality of first data pins is alternately arranged with the plurality of second data pins. A starting serial number and an ending serial number of the plurality of first data lines are a staring serial number and an ending serial number of a first predetermined serial number range. A starting serial number and an ending serial number of the plurality of second data lines are a staring serial number and an ending serial number of a second predetermined serial number range. A starting serial number and an ending serial number of the plurality of first data pins are a staring serial number and an ending serial number of a first mapping range. A starting serial number and an ending serial number of the plurality of second data pins are a staring serial number and an ending serial number of a second mapping range, respectively. The method for transmitting data includes: sequentially determining serial numbers of data pins corresponding to a plurality of channel data; and transmitting the plurality of channel data based on the serial numbers of the data pins corresponding to the plurality of channel data. A process of determining one serial number of the serial numbers of one data pin of the data pins corresponding to a current channel datum of the plurality of channel data includes: determining whether a serial number of a data line corresponding to the current channel datum is a staring serial number of a first predetermined serial number range; and when the serial number of the data line corresponding to the current channel datum is the staring serial number, mapping one of a staring serial number and an ending serial number of a first mapping range as the serial number of the data line corresponding to the current channel datum, and resetting a counting value; determining whether the serial number of the data line corresponding to the current channel datum is one of non-starting serial numbers of the first predetermined serial number range; and when the serial number of the data line corresponding to the current channel datum is one of non-starting serial numbers of the first predetermined serial number range, increasing a current counting value by 1 within a first counting range, determining a current serial number step based on the current counting value, and mapping a sum of the current serial number step and another serial number of the serial numbers of another data pin of the data pins that corresponds to a previous channel datum previous to the current channel datum as the serial number of the data pin corresponding to the current channel datum; determining whether the serial number of the data line corresponding to the current channel datum is a starting serial number of a second predetermined serial number range, when the serial number of the data line corresponding to the current channel datum is the starting serial number of the second predetermined serial number range, mapping a starting serial number of a second mapping range as the serial number of the data pin corresponding to the current channel datum, and resetting the counting value; and determining whether the serial number of the data line corresponding to the current channel datum is one of non-starting serial numbers of the second predetermined serial number range; and when the serial number of the data line corresponding to the current channel datum is one of non-starting serial numbers of the second predetermined serial number range, increasing the counting value by 1 within a second counting range, determining the current serial number step based on the current counting value, and mapping a sum of the current serial number step and the serial number of the data pin corresponding to the previous channel datum as the serial number of the data pin corresponding to the current channel datum.

In a third aspect, a non-transitory computer-readable medium is provided. The non-transitory computer-readable medium includes computer instructions, and when the computer instructions are run on an electronic device, the computer instructions cause the electronic device to perform a method for transmitting data. The method for transmitting data includes: sequentially determining serial numbers of data pins corresponding to a plurality of channel data; and transmitting the plurality of channel data based on the serial numbers of the data pins corresponding to the plurality of channel data. A process of determining one serial number of the serial numbers of one data pin of the data pins corresponding to a current channel datum of the plurality of channel data includes: determining whether a serial number of a data line corresponding to the current channel datum is a staring serial number of a first predetermined serial number range; and when the serial number of the data line corresponding to the current channel datum is the staring serial number, mapping one of a staring serial number and an ending serial number of a first mapping range as the serial number of the data line corresponding to the current channel datum, and resetting a counting value; determining whether the serial number of the data line corresponding to the current channel datum is one of non-starting serial numbers of the first predetermined serial number range; and when the serial number of the data line corresponding to the current channel datum is one of non-starting serial numbers of the first predetermined serial number range, increasing a current counting value by 1 within a first counting range, determining a current serial number step based on the current counting value, and mapping a sum of the current serial number step and another serial number of the serial numbers of another data pin of the data pins that corresponds to a previous channel datum previous to the current channel datum as the serial number of the data pin corresponding to the current channel datum; determining whether the serial number of the data line corresponding to the current channel datum is a starting serial number of a second predetermined serial number range, when the serial number of the data line corresponding to the current channel datum is the starting serial number of the second predetermined serial number range, mapping a starting serial number of a second mapping range as the serial number of the data pin corresponding to the current channel datum, and resetting the counting value; and determining whether the serial number of the data line corresponding to the current channel datum is one of non-starting serial numbers of the second predetermined serial number range; and when the serial number of the data line corresponding to the current channel datum is one of non-starting serial numbers of the second predetermined serial number range, increasing the counting value by 1 within a second counting range, determining the current serial number step based on the current counting value, and mapping a sum of the current serial number step and the serial number of the data pin corresponding to the previous channel datum as the serial number of the data pin corresponding to the current channel datum.

DESCRIPTION OF EMBODIMENTS

Terms illustrated in the embodiments are used to explain the embodiments, rather than limiting the present disclosure.

Figure 1:
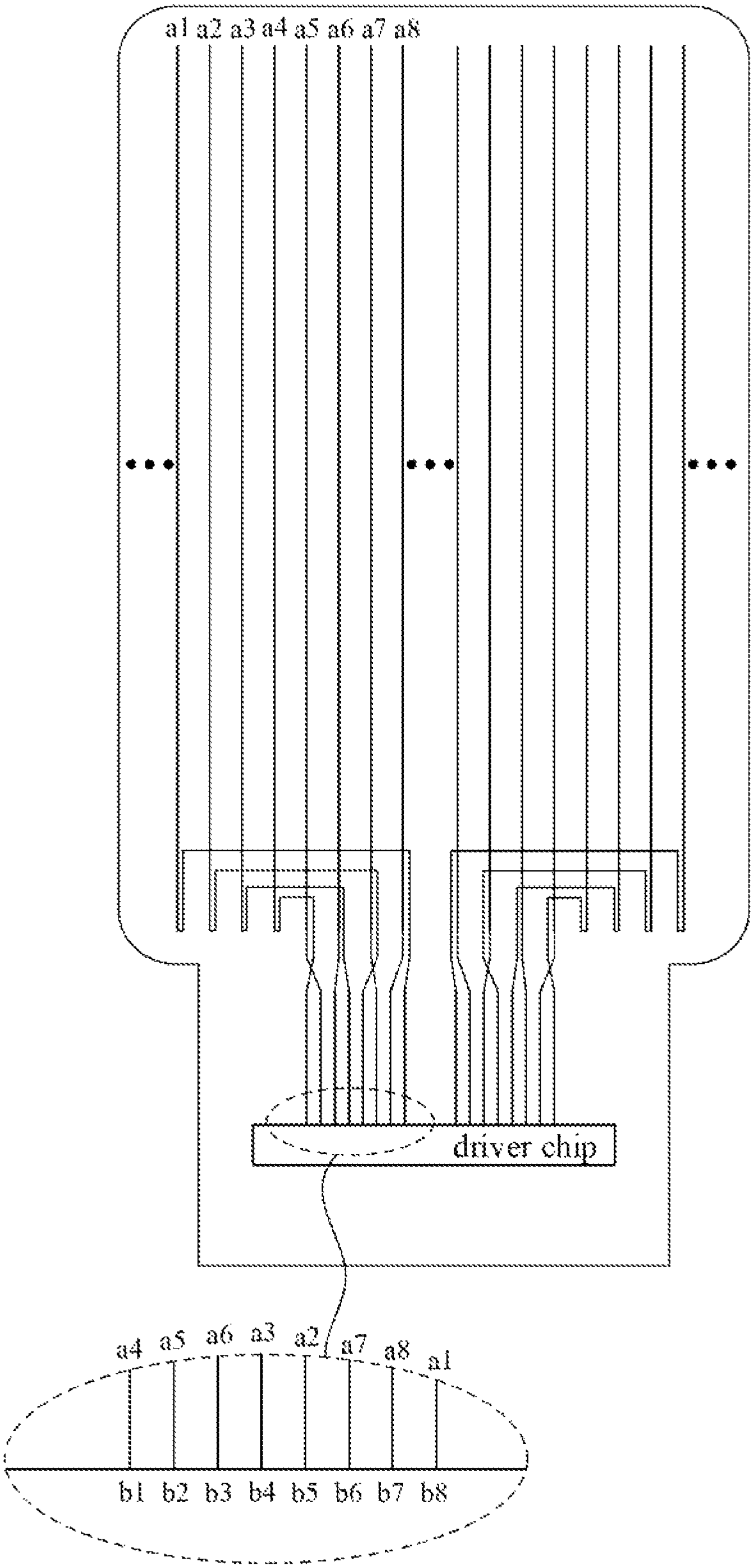
FIG. 1 (Prior Art)
FIG. 1 is a schematic diagram of an electronic device in the related art.
Figure 2:
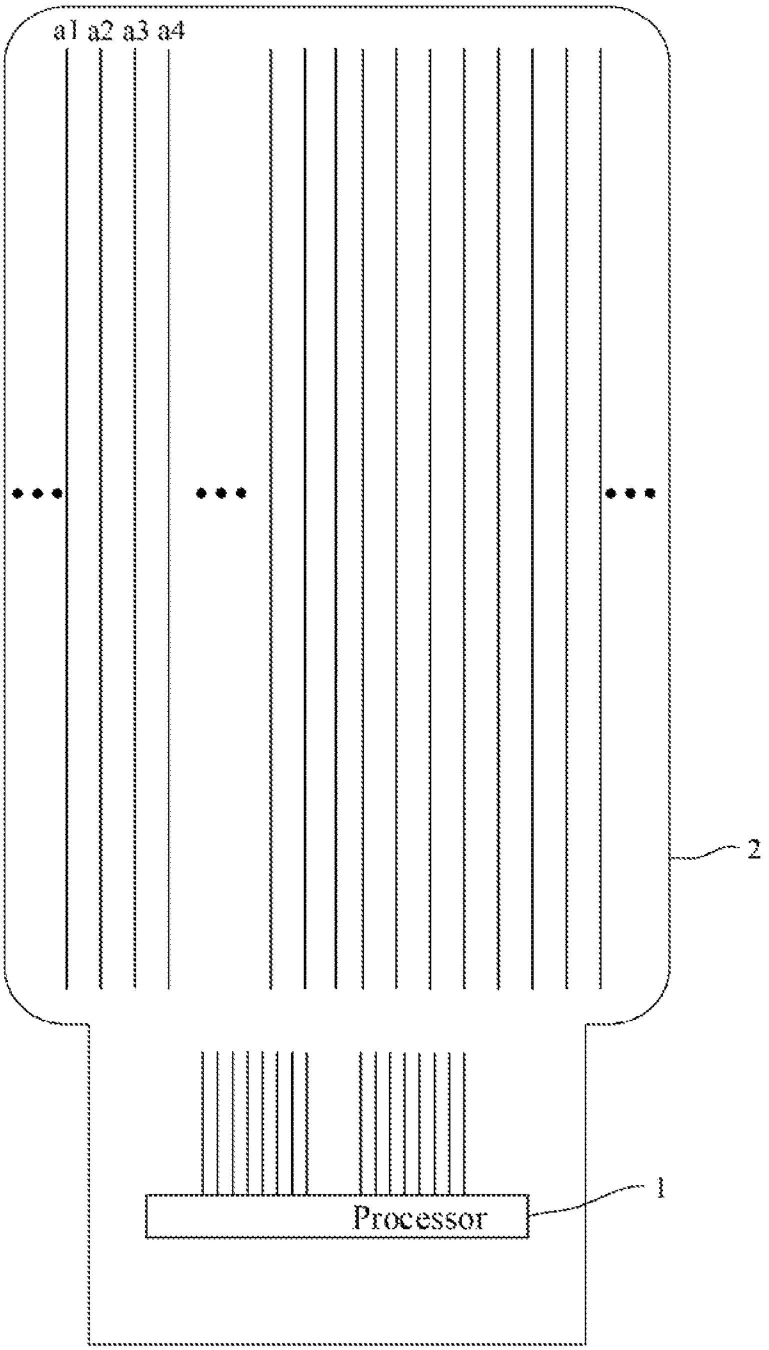
FIG. 2 is a schematic diagram of an electronic device according to embodiments of the present disclosure.
Figure 3:
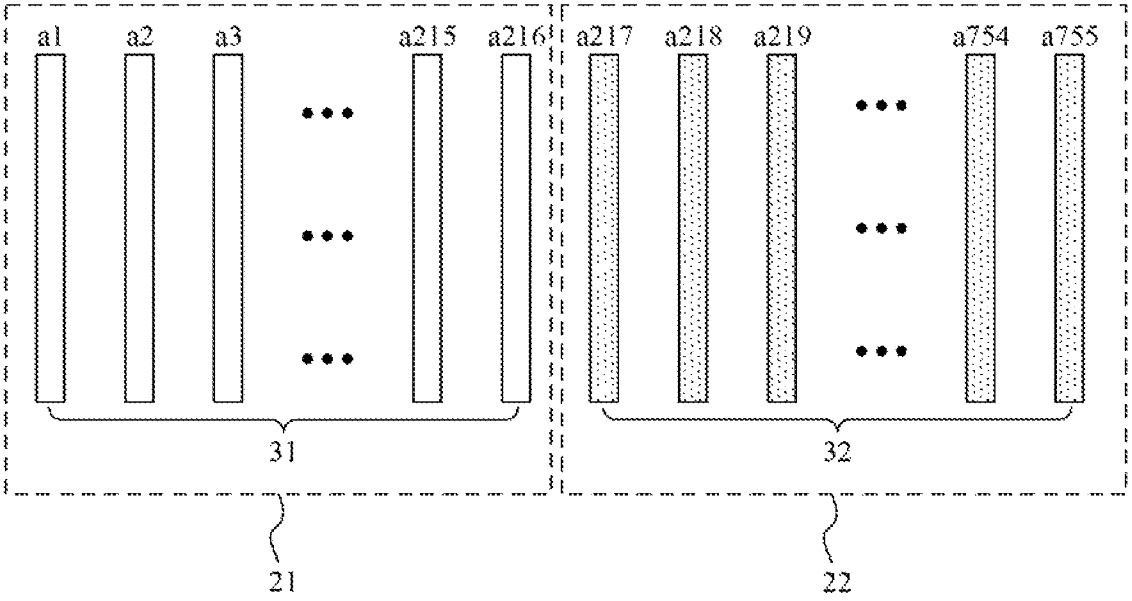
FIG. 3 is a schematic diagram showing an arrangement of data lines in a partial region in FIG. 2.
Figure 4:
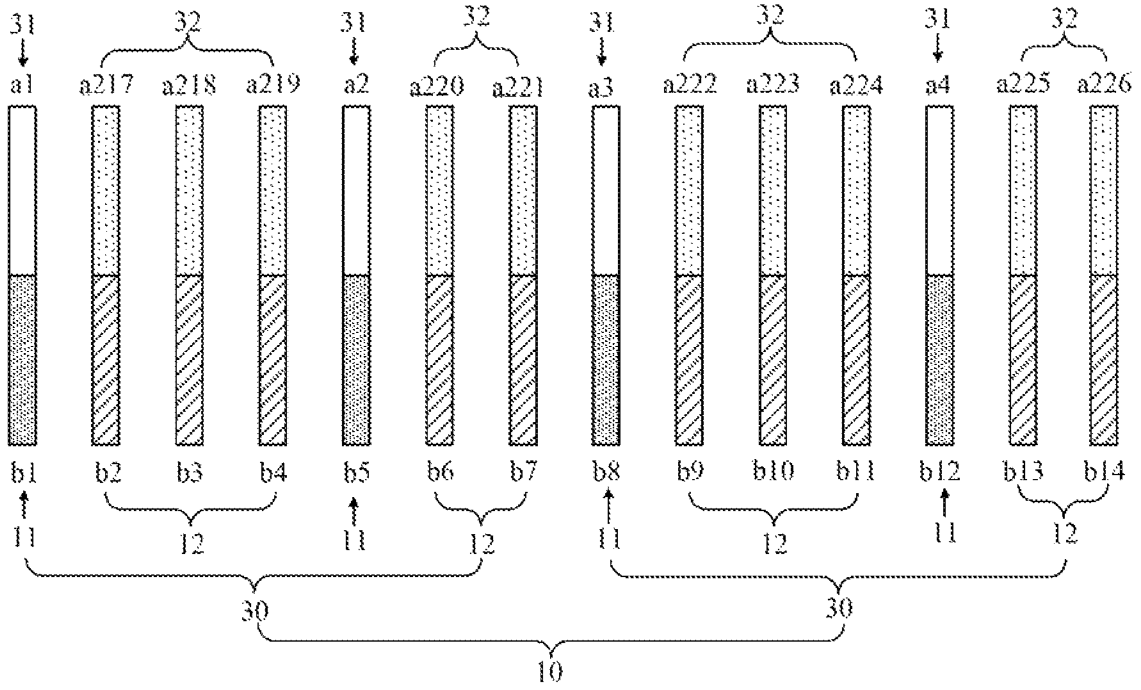
FIG. 4 is a schematic diagram showing a connection relationship of data lines and data pins in a partial region in FIG. 2.
Figure 5:
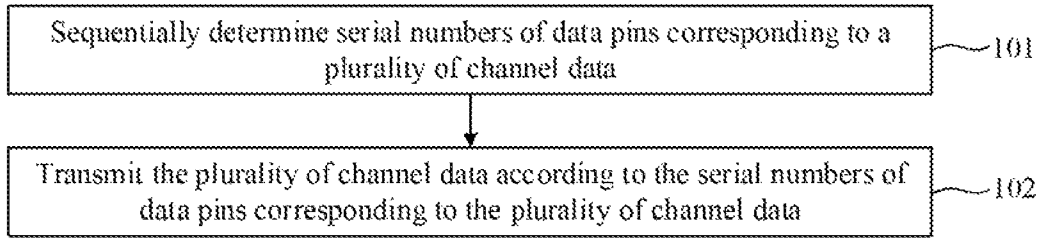
FIG. 5 is a schematic flow chat of a method for transmitting data according to embodiments of the present disclosure.

As shown in FIG. 2, FIG. 3, and FIG. 4, embodiments of the present disclosure provide an electronic device, and the electronic device includes a processor 1 and a memory (not shown in FIG. 2), and a display panel. The memory is configured to store at least one instruction. The instruction is loaded and executed by processor 1, such that a method for transmitting data is implemented. The process and principle of the method for transmitting data will be descried in details hereinafter. The processor 1 includes multiple data pins 10 that are sequentially arranged. For example, the serial numbers of the data pins 10 of the processor 1 increase sequentially from left to right. The display panel 2 includes first data lines 31 sequentially arranged in a first region 21 and second data lines 32 sequentially arranged in a second region 22. For example, the plurality of first data lines 31 includes first data lines a1 to a216, and the plurality of second data lines 32 includes second data lines a217 to a755. The plurality of first data lines 31 is connected to first data pins 11 of the plurality of data pins 10, respectively. The plurality of second data lines 32 is connected to second data pins 12 of the plurality of data pins 10, respectively. The first data pins 11 are arranged alternatively with the second data pins 12. A starting serial number RDs and an ending serial number RDe of the plurality of first data lines 31 are a starting serial number and an ending serial number of a first predetermined serial number range W1 respectively. For example, the starting serial number RDs of the plurality of first data lines 31 and the starting serial number of the first predetermined serial number range W1 are both 1, and the ending serial number RDe of the plurality of first data lines 31 and the ending serial number of the first predetermined serial number range W1 are both 216. That means, the first predetermined serial number range W1 is [RDs, RDe]=[1, 216]. A starting serial number Ads and an ending serial number ADe of the plurality of second data lines 32 are a starting serial number and an ending serial number of a second predetermined serial number range W2 respectively. For example, the starting serial number ADs of the plurality of second data lines 32 and the starting serial number of the second predetermined serial number range W2 are both 217, and the ending serial number ADe of the plurality of second data lines 32 and the ending serial number of the second predetermined serial number range W2 are both 755. That means, the second predetermined serial number range W2 is [ADs, ADe]=[217, 755]. A starting serial number RSs and an ending serial number RSe of the plurality of first data pins 11 are a starting serial number and an ending serial number of a first mapping range T1 respectively. For example, RSs=1, and RSe=968. That means, T1=[RSs, RSe]=[1, 968]. A starting serial number ASs and an ending serial number ASe of the plurality of second data pins 12 are a starting serial number and an ending serial number of a second mapping range T2 respectively. For example, ASs=2, and ASe=755. That means, T2=[ASs, ASe]=[2, 755].

The display panel 2 further includes a plurality of pixels arranged in a matrix. Pixels in each pixel column are connected to one data line. Each data line is configured to transmit a datum supplied by the processor 1 to the pixel in the pixel column corresponding to the data line. In this way, the pixel displays with a greyscale corresponding to the received data, and thus the plurality of pixels arranged in array displays an image. In embodiments of the present disclosure, the plurality of data lines is not sequentially electrically connected to the plurality of data pins of the processor 1 in the serial number sequence. The data acquired by the processor 1 and used for displaying an image includes a plurality of channel data. That means, each data line corresponds to one of the plurality of channel data. The processor 1 needs to determine the data pin corresponding to the channel data when acquiring the channel datum, and then transits the channel datum through the corresponding data pin. Accordingly, the processor 1 determines the data pin corresponding to the channel datum by executing a method for transmitting data, and then transmits the channel datum. The method for transmitting data is described below. The processor 1 in embodiments of the present disclosure refers to the processor for driving the display panel 2 to display images. The processor 1 may be a processor for driving the display panel to display an image. For example, the electronic device is a mobile phone, the electronic device includes the display panel 2 and the processor 1 for driving the display panel, and also includes processors such as an application processor (AP).

The processor may include one or more process units. Different process units may be independent devices, or may be integrated in one or more processor.

The memory may be used to store computer executable program codes. The executable program codes include instructions. The memory may include a program storing area and a data storing area. The program storing area stores an operating system, applications required by at least one function (such as sound playback function, image playback function, etc.), and the like. The data storing area stores data (such as audio data, phone book, etc.) generated during the use of electronic device. In addition, the memory may include high-speed random access memory, may also include non-volatile memory, such as at least one disk storage device, flash memory device, universal flash memory (UFS) and the like. The processor performs various functional applications as well as data processing of the electronic device by running instructions stored in memory.

The electronic device may be a chip, a mobile phone, a tablet, a personal computer (PC), a personal digital assistant (PDA), a smart watch, a netbook, a wearable electronic device, an augmented reality (AR) device, a virtual reality (VR) device, an in-vehicle device, a smart car, a smart audio, smart glasses, a smart TV, a server, etc.

Embodiments of the present disclosure provide a method for transmitting data. The method may be applied to the above electronic device. The method is performed by the processor 1. As shown in FIG. 2 to FIG. 6, the method includes steps 101 and 102.

At step 101, serial numbers of a plurality of data pins 10 corresponding to a plurality of channel data are sequentially determined.

At step 102, the plurality of channel data is transmitted according to the serial numbers of the plurality of data pins 10 corresponding to the plurality of channel data.

For example, when the display panel 2 displays each frame of image, it needs to scan each row of pixels. During the scanning of each row of pixels, each of the plurality of channel data is supplied to the corresponding column of pixels through the corresponding data line. During the transmission process, the step 101 is first performed. The serial number of the data line corresponding to the channel data to be transmitted is known, so the serial numbers of the data pins corresponding to the plurality of channel data can be sequentially determined according to the sequence of the serial numbers of the data lines. For example, the data lines a1 to a755 correspond to the channel data data1 to data 755 respectively and sequentially. The channel data data1 is acquired firstly, so it is firstly determined that the serial number of the data pin 10 corresponding to the channel data data1 is 1, and the channel data data1 is transmitted though the data pin b1. The channel data data2 is acquired after the channel data data1, and it is determined that the serial number of the data pin 10 corresponding to the channel data data2 is 5. Accordingly, the channel data data2 is transmitted through the data pin b5. Then, the serial number of the data pin 10 corresponding to next channel data is determined. Similarly, the serial numbers of the data pins 10 for transmitting the plurality of channel data can be determined, and the plurality of channel data can be transmitted through the corresponding data pins 10. The method for determining the corresponding data pin 10 of each channel data is described below.

The method for determining the serial number of the data pin 10 corresponding to a channel datum includes the following steps.

In step 1011, whether the serial number of the data line corresponding to a current channel datum is the starting serial number RDs of the first predetermined serial number range [RDs, RDe] is determined; when the serial number of the data line corresponding to the current channel datum is the starting serial number RDs, step 1012 is performed; and when the serial number of the data line corresponding to the current channel datum is not the starting serial number RDs, step 1013 is performed. At step 1012, one of the starting serial number and the ending serial number of the first mapping range [RSs, RSe] is mapped to the serial number of the data pin corresponding to the current channel datum, and a counting value cnt is reset.

At step 1013, whether the serial number of the data line corresponding to the current channel datum is one of the non-starting serial numbers (RDs, RDe] of the first predetermined serial number range [RDs, RDe] is determined; when the serial number of the data line corresponding to the current channel datum is one of the non-starting serial numbers, step 1014 is performed; and when the serial number of the data line corresponding to the current channel datum is one of non-starting serial numbers, step 1015 is performed. At step 1014, the current counting value cnt is increased by 1 within a first counting range, a current serial number step STEP is determined according to the current counting value cnt, a sum of the serial number of the data pin corresponding to the pervious channel data and the current serial number step is taken as the serial number of the data pin corresponding to the current channel datum. It can be understood that the non-starting serial number indicates a number that is not the starting serial number.

At step 1015, whether the serial number of the data line corresponding to the current channel datum is the starting serial number ADs of the second predetermined serial number range [ADs, ADe] is determined, when the serial number of the data line corresponding to the current channel datum is the starting serial number ADs, step 1016 is performed; and when the serial number of the data line corresponding to the current channel datum is not the starting serial number ADs, step 1017 is performed. At step 1016, the starting serial number ASs of the second mapping range [ASs, ASe] is taken as the serial number of the data pin corresponding to the current channel datum, and the counting value cnt is reset.

At step 1017, whether the serial number of the data line corresponding to the current channel datum is one of the non-starting serial numbers (ADs, ADe] of the second predetermined serial number range [ADs, ADe] is determined; and when the serial number of the data line corresponding to the current channel datum is one of the non-starting serial numbers, step 1018 is performed. At step 1018, the current counting value cnt is increased by 1 within a second counting range, a current serial number step STEP is determined according to the current counting value cnt, a sum of the serial number of the data pin corresponding to a pervious channel datum pervious to the current channel datum and the current serial number step is taken as the serial number of the data pin corresponding to the current channel datum.

For example, the counting value cnt and the serial number step STEP are dynamic data in the process of determining the serial number of the data pin corresponding to the channel datum. The default values of the counting value cnt and the serial number step STEP are 0. That means the reset counting value cnt is 0. The serial number step STEP is calculated according to the current counting value cnt.

In the above steps 1012, 1014, 1016 and 1018, after the serial number of the data pin of the current channel datum is determined, the serial number of the data pin of the next channel datum is determined. That means the step 1011 is performed for the next channel datum.

For example, the initial channel datum is channel datum data1, it corresponds to data line a1, and its serial number is 1. Firstly, the channel data data1 is taken as the current channel datum. At step 1011, it is determined that the serial number of the data line corresponding to the channel datum data1 is the starting serial number 1 of the first predetermined serial number range [1, 216], and thus step 1012 is performed next. The serial number of the data pin corresponding to the channel datum data1 is determined to be 1. That is, the data pin corresponding to the channel data data1 is data pin 1. The counting value cnt is reset, so the reset counting value cnt is 0. Accordingly, the channel datum data1 can be transmitted to the data line a1 through the data pin b1. After the data pin corresponding to the channel datum data1 is determined, the channel datum data2 is taken as the current channel datum. The data line corresponding to the channel datum data2 is data line a2, and the serial number of the data line a2 is 2. At step 1011, it is determined that the serial number of the data line a2 is not the starting serial number of the first predetermined serial number range [1, 216]. At step 1013, it is determined that the serial number of the data line a2 is one of the non-starting numbers (1, 216] of the first predetermined serial number range, and thus step 1014 is performed. At step 1014, the counting value cnt is increased by 1, and thus the updated counting value cnt is equal to 1. The current serial number STEP is determined to be 4 according to cnt=1. The sum of the serial number 1 of the data pin corresponding to the channel datum data1 and the current serial number step (STEP=4) is 5, and the serial number of the data pin corresponding to the channel datum data2 is determined to be 5. That means, the channel datum data2 corresponds to data pin b5. Accordingly, the channel datum data2 is transmitted to the data line a2 through the data pin b5. Then, the channel datum data3 is taken as the current channel datum. The channel data data3 corresponds to the data line a3, and the serial number of the data line a3 is 3. At step 1013, it is determined that the serial number of the data line a3 is one of the non-starting numbers (1, 216] of the first predetermined serial number range, and thus step 1014 is performed. At step 1014, the counting value cnt is increased by 1, and thus the updated counting value cnt is equal to 2. The current serial number STEP is determined to be 3 according to cnt=2. The sum of the serial number 5 of the data pin corresponding to the channel datum data2 and the current serial number step (STEP=3) is 8, and the serial number of the data pin corresponding to the channel data data3 is determined to be 8. That means, the channel datum data3 corresponds to data pin b8. The channel data data4 corresponds to the data line a4, and the serial number of the data line a4 is 4. Step 1013 determines that the serial number 4 of the data line a4 is one of the non-starting numbers (1, 216] of the first predetermined serial number range, and thus step 1014 is performed. In step 1014, the counting value cnt is increased by 1, and thus the updated counting value cnt is equal to 3. The current serial number STEP is determined to be 4 according to cnt=3. The sum of the serial number 8 of the data pin corresponding to the channel datum data3 and the current serial number step (STEP=4) is 12, and the serial number of the data pin corresponding to the channel data data4 is determined to be 12. Similarly, the serial numbers of the data pins corresponding to the channel datum data5 to data216 can be determined respectively. After the serial number of the data pin corresponding to the channel datum data216 is determined, it begins to determine the serial number of the data pin corresponding to the channel datum data217. The channel datum data217 corresponds to the data line a217, and the serial number 217 of the data line a217 is the starting serial number of the second predetermined serial number range [217, 755]. Therefore, the starting serial number 2 of the second mapping range [2, 755] is taken as the serial number of the data pin corresponding to the channel datum data217. That means, the channel datum data217 is transmitted to the data line a217 though the data pin b2. The counting value cnt is reset to 0. For the channel datum data218, the serial number of the data line a218 corresponding to the channel datum data218 is one of the non-starting serial numbers (217, 755]. The counting value cnt is increased by 1, and thus is equal to 1. The serial number step STEP is determined to be 1 according to cnt=1. The sum of the serial number 2 of the data pin corresponding to the channel datum data217 and the current serial number step (STEP=2) is 3. That means, the channel datum data218 corresponds to the data pin b3. Similarly, the serial numbers of the data pins corresponding to the channel datum data219 to data755 can be determined, respectively.

According to the electronic device and the method for transmitting data of embodiments of the present disclosure, the data lines are divided into different groups, and thus the serial numbers of the data lines are in different predetermined ranges. Channel data corresponding to data lines in different predetermined ranges correspond to their logics respectively. The serial number step is calculated according to the counting value and the corresponding logic. The mapping result of the current channel datum is calculated according to the serial number step and the mapping result of the previous channel datum. In this way, the serial numbers of the data pins corresponding to the plurality of channel data are sequentially acquired, and the data pin for transmitting each channel data is determined. As a result, it does not need to provide a large storage space for storing the correspondence between the data lines and the data pins, thereby reducing the requirement of storage space in the processor.

In some embodiments, as shown in FIG. 4, the plurality of first data pins 11 and the plurality of second data pins 12 define a plurality of repeating units 30 and arranged sequentially. FIG. 4 shows example repeating units 30. Each repeating unit 30 includes RC0 first data pins 11, AC0 second data pins 12, RC1 first data pins 11, AC1 second data pins 12, . . . , RCM first data pins 11, and ACM second data pins 12, where M is a non-negative integer. For example, as shown in FIG. 4, M=1, RC0=RC1=1, AC0=3, and AC1=2. That means each repeating unit 30 includes one first data pin 11, three second data pins 12, one first data pin 11, and two second data pins 12 that are sequentially arranged. The current counting value is reset to 0. The step of increasing the current counting value by 1 within the first counting range and determining the current serial number step according to the current counting value includes the following steps. Whether the current counting value cnt is the maximum value M1 of the first counting range is determined. When the current counting value cnt is the maximum value M1, the counting value cnt is set to 1. When the current counting value cnt is not the maximum value M1, the counting value cnt is increased by 1. The maximum value M1 of the first counting range is equal to RC0+RC1+RC2+ . . . +RCM, RCi is a positive integer, and i=0, 1, . . . , M. For example, in the embodiment shown in FIG. 4, M1=1+3=4. Whether the current counting value cnt is equal to one of the values RC0, RC0+RC1, . . . , and RC0+RC1+RC2+ . . . +RCM is determined. When the current counting value cnt is equal to one value of the values RC0, RC0+RC1, . . . , RC0+RC1+RC2+ . . . +RCM, a gap value corresponding to the last addend of the value that is equal to the current counting value is taken as the current serial number step STEP. When the current counting value cnt is not equal to any one of the values RC0, RC0+RC1, . . . , and RC0+RC1+RC2+ . . . +RCM, the current serial number step STEP is set to 1. The gap value corresponding to RCi is Rseqi. The step of increasing the counting value by 1 within the second counting range and determining the current serial number step according to the current counting value includes the following steps. Whether the current counting value cnt is equal to the maximum value M2 of the second counting range is determined. When the current counting value cnt is equal to the maximum value M2, the counting value cnt is set to 1. When the current counting value cnt is not equal to the maximum value M2, the counting value cnt is increased by 1. The maximum value M2 of the second counting range is equal to AC0+AC1+ . . . +ACM, where ACi is a positive integer. For example, as shown in FIG. 4, M2=2+3=5. Whether the current counting value cnt is equal to one value of the values AC0, AC0+AC1, . . . , and AC0+AC1+AC2+ . . . +ACM is determined, and when the current counting value cnt is equal to one value of the values AC0, AC0+AC1, . . . , and AC0+AC1+AC2+ . . . +ACM, a gap value corresponding to the last addend of the one of the values AC0, AC0+AC1, . . . , and AC0+AC1+AC2+ . . . +ACM, equal to the current counting value, is taken as the current serial number step STEP. When the current counting value cnt is not equal to any one of the values AC0, AC0+AC1, . . . , and AC0+AC1+AC2+ . . . +ACM, the current serial number step STEP is set to 1. The gap value of ACi is Aseqi, Aseqi=RCi+1, and Rseqi=ACi+1. For example, in the example shown in FIG. 4, the gap value Rseq0 corresponding to RC0 is equal to 3+1=4, the gap value Rseq1 corresponding to RC1 is equal to 2+1=3, the gap value Aseq0 corresponding to AC0 is equal to 1+1=2, and the gap value Aseq1 corresponding to AC1 is equal to 1+1=2.

Figure 7:
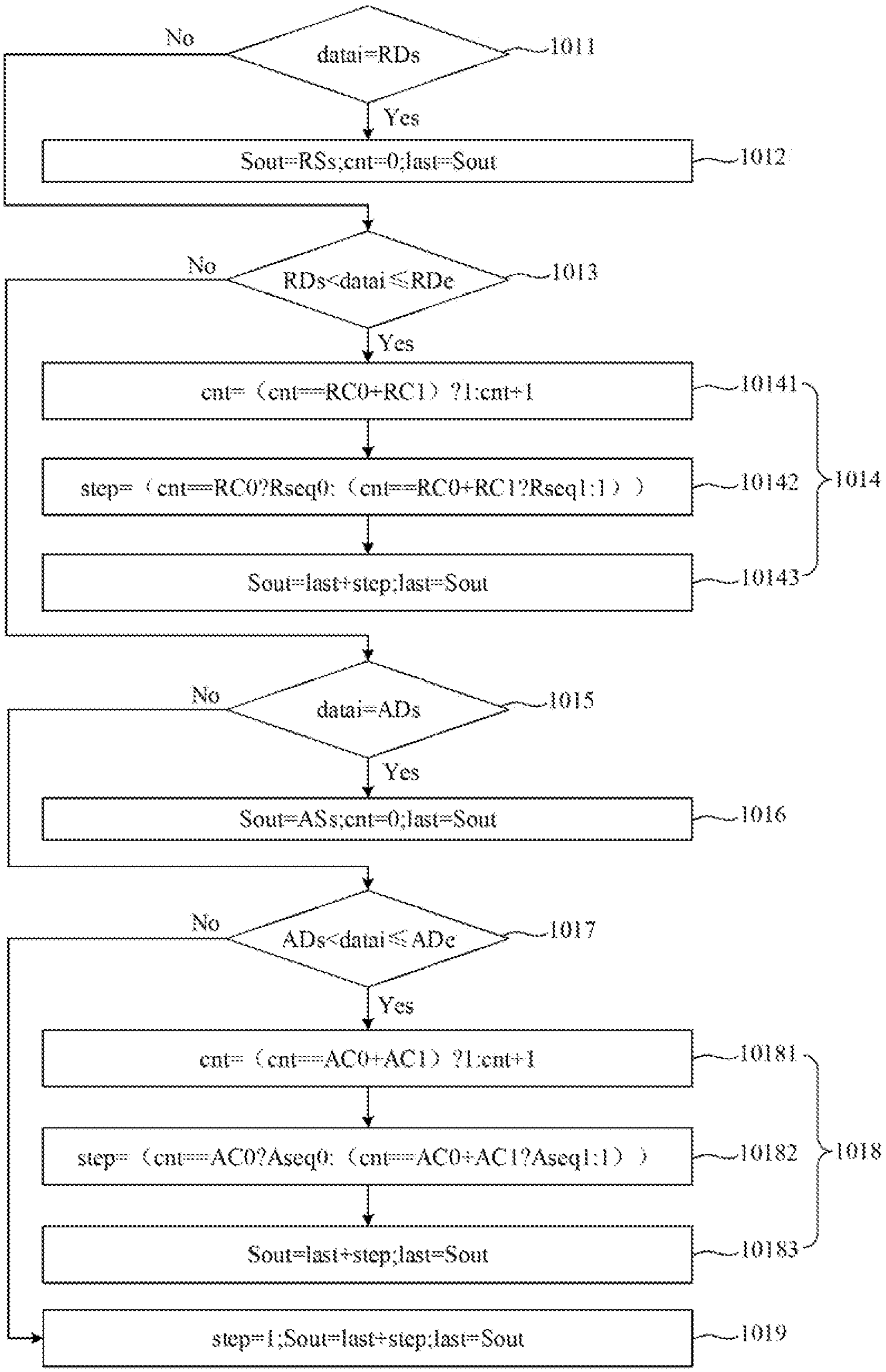
FIG. 7 is a schematic flow chat of pseudo codes for determining a serial number of a data pin corresponding to a channel data according to embodiments of the present disclosure.

An embodiment is described below in conjunction with a specific scene as well as table 1 and FIG. 4 and FIG. 7.

TABLE 1

| | | | |
|---|---|---|---|
| RDs | 1 | RSs | 1 |
| RDe | 216 | RSe | 754 |
| ADs | 217 | Ass | 2 |
| ADe | 755 | ASe | 755 |
| RC0 | 1 | AC0 | 3 |
| RC1 | 1 | AC1 | 2 |
| Rseq0 | 4 | Aseq0 | 2 |
| Rseq1 | 3 | Aseq1 | 2 |

Table 1 is data characteristics corresponding to the structure shown in FIG. 4. FIG. 7 is a flowchart of pseudo codes corresponding to FIG. 6 and illustrates the structure shown in FIG. 4 for example. For example, the serial number of the data line corresponding to the current channel datum is datai. First, i is set to 1. It is determined at step 1011 that the serial number datai=1=RDs, so step 1012 is performed next. The output Sout is Sout=RSs=1. The output Sout is the serial number of the data pin corresponding to the current channel datum. That means the channel datum data1 is transmitted to the data line a1 though the data pin b1, and the counting value cnt is set to 0, last=Sout=1, and then i=i+1=2 so as to calculate the serial number of the data pin corresponding to the next channel datum. The parameter last is a datum in the calculating process and represents the output result of the calculating process for the previous channel datum, that is, the serial number of the data pin corresponding to the previous channel datum.

data2=2∈(RDs, RDe], and thus step 10141 is performed. Since RC0+RC1=1+1=2≠cnt=0, cnt=0+1=1, and step 10142 is performed. Since cnt=1=RC0, STEP=Rseq0=4. Then, step 10143 is performed, Sout=1+4=5. That means it is determined that the current channel datum is transmitted to the data line a2 through the data pin b5, last=Sout=5, and then i is set to 3.

data3=3∈(RDs, RDe], and thus step 10141 is performed. Since RC0+RC1=1+1=2≠cnt=1, cnt=1+1=1, and step 10142 is performed. Since cnt=2=RC0+RC1, STEP=Rseq1=3. Then, step 10143 is performed, Sout=5+3=8. That means it is determined that the current channel datum is transmitted to the data line a3 through the data pin b8, last=Sout=8, and then i is set to 4.

data4=4∈(RDs, RDe], and thus step 10141 is performed. Since RC0+RC1=1+1=2=cnt, cnt is set to 1, and step 10142 is performed. Since cnt=1=RC0, STEP=Rseq0=4. Then, step 10143 is performed, Sout=8+4=12. That means it is determined that the current channel datum is transmitted to the data line a4 through the data pin b12, last=Sout=12, and then i is set to 5.

data5=5∈(RDs, RDe], and thus step 10141 is performed. Since RC0+RC1=1+1=2≠cnt=1, cnt is increased by 1 and becomes 2, and step 10142 is performed. Since cnt=2=RC0+RC1, STEP=Rseq1=3. Then, step 10143 is performed, Sout=12+3=15. That means it is determined that the current channel datum is transmitted to the data line a3 through the data pin b8, last=Sout=8, and then i is set to 6. Similarly, the counting value cnt cycles between 1 to 2 (is alternately equal to 1 and 2), and the serial number step STEP is calculated according to the counting value. Then, the current output result is calculated according to the current serial number step STEP and the previous output result, and thus the first data pin 11 corresponding to the current channel datum can be determined. That means the serial numbers of the data pins corresponding to the channel data data1 to data216 can be determined. Then, i is set to 217.

data217=217=Ads, so step 1016 is performed. The output Sout=Ass=2 and is the serial number of the data pin corresponding to the current channel datum. That means it is determined that the current channel datum is transmitted to the data line a217 though the data pin b2. The counting value cnt is reset to 0, last=Sout=2, and i is increased by 1 and equal to 218.

data218=218∈(ADs, ADe], so step 10181 is performed. Since AC0+AC1=3+2=5≠cnt=0, the counting value cnt is set to 0+1=1, and then step 10812 is performed. Since cnt=1≠AC0≠AC0+AC1, the serial number step STEP is equal to 1. Then, step 10813 is performed, and Sout=2+1=3. That means it is determined that the channel data is transmitted to the data line a218 through the data pin b3, and last=Sout=3. Next, i is set to 219.

data219=219∈(ADs, ADe], so step 10181 is performed. Since AC0+AC1=3+2=5≠cnt=1, the counting value cnt is set to 1+1=2, and then step 10812 is performed. Since cnt=2≠AC0≠AC0+AC1, the serial number step STEP is equal to 1. Then, step 10813 is performed, and Sout=3+1=4. That means it is determined that the channel data is transmitted to the data line a219 through the data pin b4, and last=Sout=4. Next, i is set to 220.

data220=220∈(ADs, ADe], so step 10181 is performed. Since AC0+AC1=3+2=5≠cnt=2, the counting value cnt is set to 2+1=3, and then step 10812 is performed. Since cnt=3=AC0, the serial number step STEP=Aseq0=2. Then, step 10813 is performed, and Sout=4+2=6. That means it is determined that the channel data is transmitted to the data line a220 through the data pin b6, and last=Sout=6. Next, i is set to 221.

data221=221∈(ADs, ADe], so step 10181 is performed. Since AC0+AC1=3+2=5≠cnt=3, the counting value cnt is set to 3+1=4, and then step 10812 is performed. Since cnt=4≠AC0≠AC0+AC1, the serial number step STEP=1. Then, step 10813 is performed, and Sout=6+1=7. That means it is determined that the channel data is transmitted to the data line a221 through the data pin b7, and last=Sout=7. Next, i is set to 222.

data222=222∈(ADs, ADe], so step 10181 is performed. Since AC0+AC1=3+2=5≠cnt=4, the counting value cnt is set to 4+1=5, and then step 10812 is performed. Since cnt=5=AC0+AC1, the serial number step STEP=Aseq1=2. Then, step 10813 is performed, and Sout=7+2=9. That means it is determined that the channel data is transmitted to the data line a222 through the data pin b9, and last=Sout=9. Next, i is set to 223.

data223=223∈(ADs, ADe], so step 10181 is performed. Since AC0+AC1=3+2=5=cnt=5, the counting value cnt is set to 1, and then step 10812 is performed. Since cnt=1≠AC0≠AC0+AC1, the serial number step STEP is set to 1. Then, step 10813 is performed, and Sout=9+1=10. That means it is determined that the channel data is transmitted to the data line a223 through the data pin b10, and last=Sout=10. Next, i is set to 224. Similarly, the counting value cnt cycles between 1 to 5 (is alternately equal to 1 to 5), and the serial number step STEP is calculated according to the counting value. Then, the current output result is calculated according to the current serial number step STEP and the previous output result, and thus the second data pin 12 corresponding to the current channel datum can be determined. That means the serial numbers of the data pins corresponding to the channel data data217 to data755 can be determined.

Figure 6:
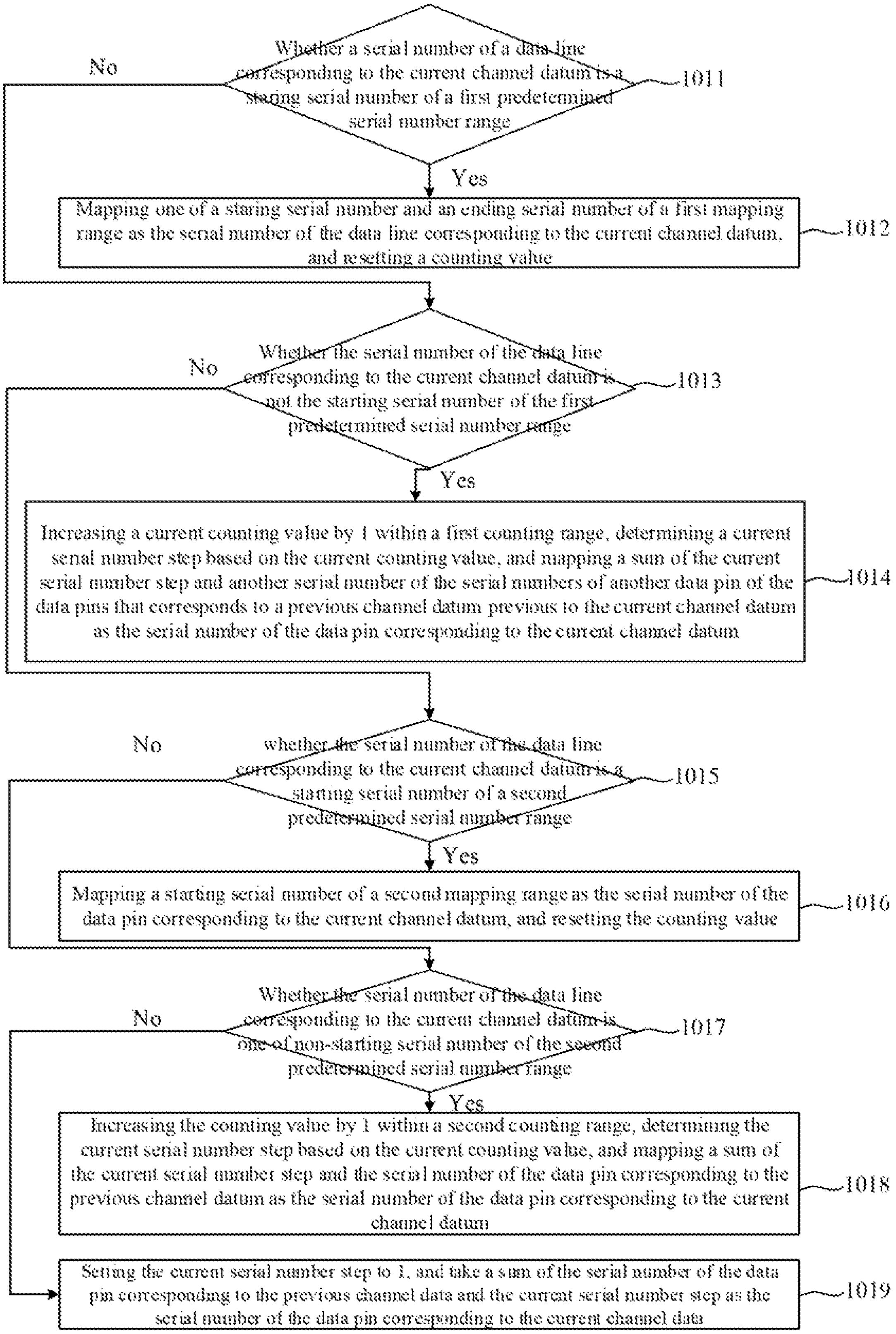
FIG. 6 is a schematic flow chat of a process of determining a serial number of a data pin corresponding to a channel data according to embodiments of the present disclosure.
Figure 8:
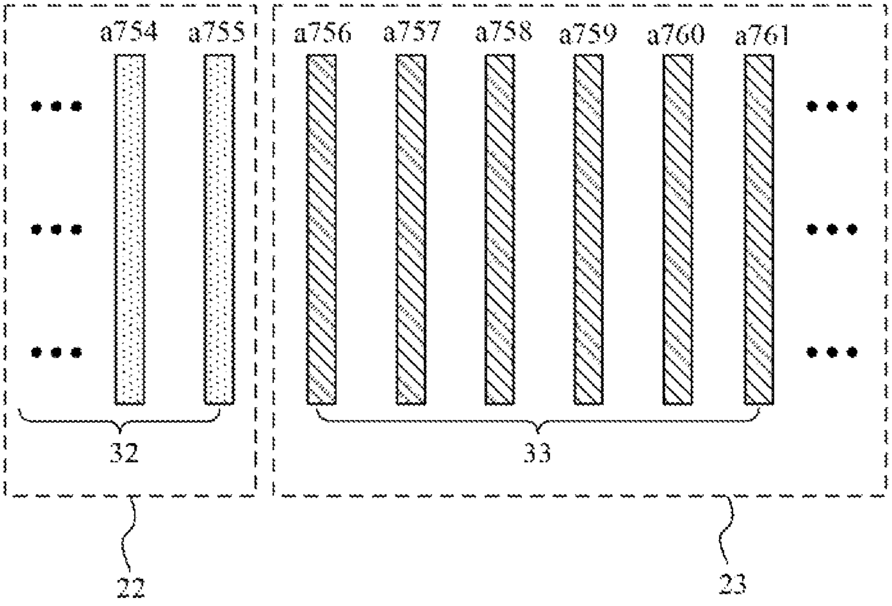
FIG. 8 is a schematic diagram showing an arrangement of data lines in another partial region in FIG. 2.
Figure 9:
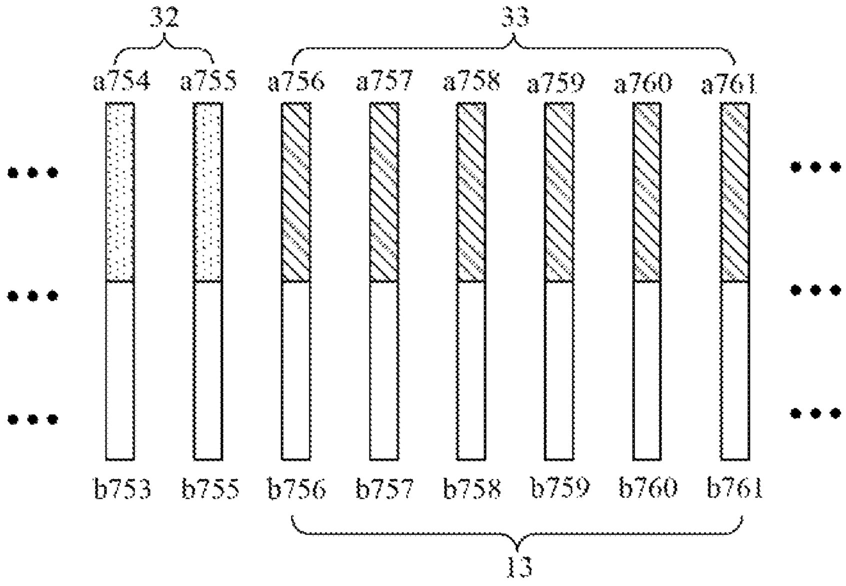
FIG. 9 is a schematic diagram showing a connection relationship of data lines and data pins in another partial region in FIG. 2.

In some embodiments, as shown in FIG. 8 and FIG. 9, the display panel further includes a plurality of third data lines 33 sequentially arranged in a third region 23. The plurality of third data lines 33 is connected to third data pins 13 of the plurality of data pins. The starting serial number and the ending serial number of the plurality of third data lines 33 are the starting serial number and the ending serial number of a third predetermined serial number range. The first region 21, the second region 22 and the third region 23 are sequentially arranged in the display panel. As shown in FIG. 6 and FIG. 7, the step of determining the serial number of the data pin corresponding to one piece of channel data includes the following steps. When the serial number of the data line corresponding to the current channel datum is within the third predetermined serial number range (that means the determination result in step 1017 is negative), step 1019 is performed, the current serial number step STEP is set to 1, and the sum of the current serial number step STEP and the serial number of the data pin corresponding to the previous channel datum is taken as the serial number of the data pin corresponding to the current channel datum.

Figure 10:
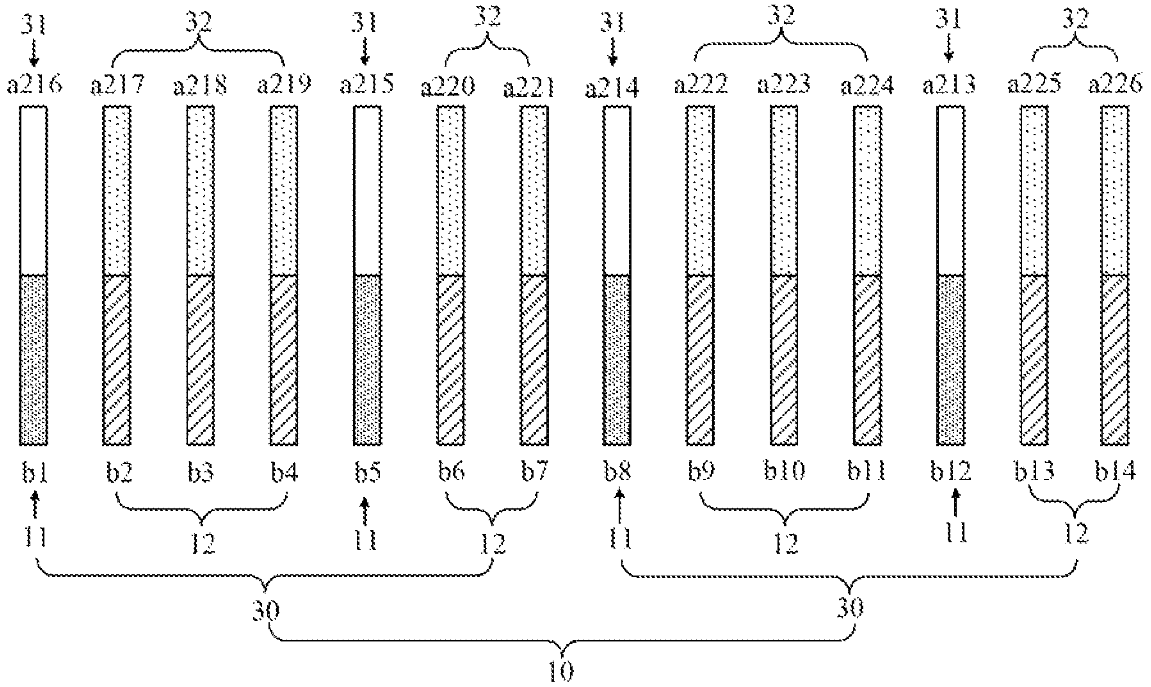
FIG. 10 is a schematic diagram showing a connection relationship of data lines and data pins in another partial region in FIG. 2.

For example, at the right side of the data line a755, the data lines a756 to a1080 are sequentially arranged from left to right. The data lines a756 to a1080 are the third data lines 33 located in the third region 23. At the right side of the data pin b755, the data pins b756 to b1080 are sequentially arranged from left to right. The data lines a756 to a1080 are connected to the data pins b756 to b1080 sequentially and respectively, rather than in an alternating manner. The data line a756 is electrically connected to the data pin b756, the data line a757 is electrically connected to the data pin b757, and so on. Therefore, for the channel data data756 to data1080 corresponding to the data lines a756 to a1080, the serial number step STEP is 1, and the sum of the serial number of the data pin corresponding to the previous channel datum and the serial number step STEP is taken as the serial number of the data pin corresponding to the current channel datum. That means from the channel data data756, In some embodiments, as shown in FIG. 4, the plurality of first data lines 31 is electrically connected to the plurality of first data pins 11 in a serial-number-increasing manner, and the arrangement direction identifier is positive. For example, D=1 represents that the arrangement direction identifier is positive. As shown in FIG. 10, the plurality of first data lines 31 is electrically connected to the plurality of first data pins 11 in a serial-number-decreasing manner, and the arrangement direction identifier is negative. For example, D=0 represents that the arrangement direction identifier is negative.

Figure 11:
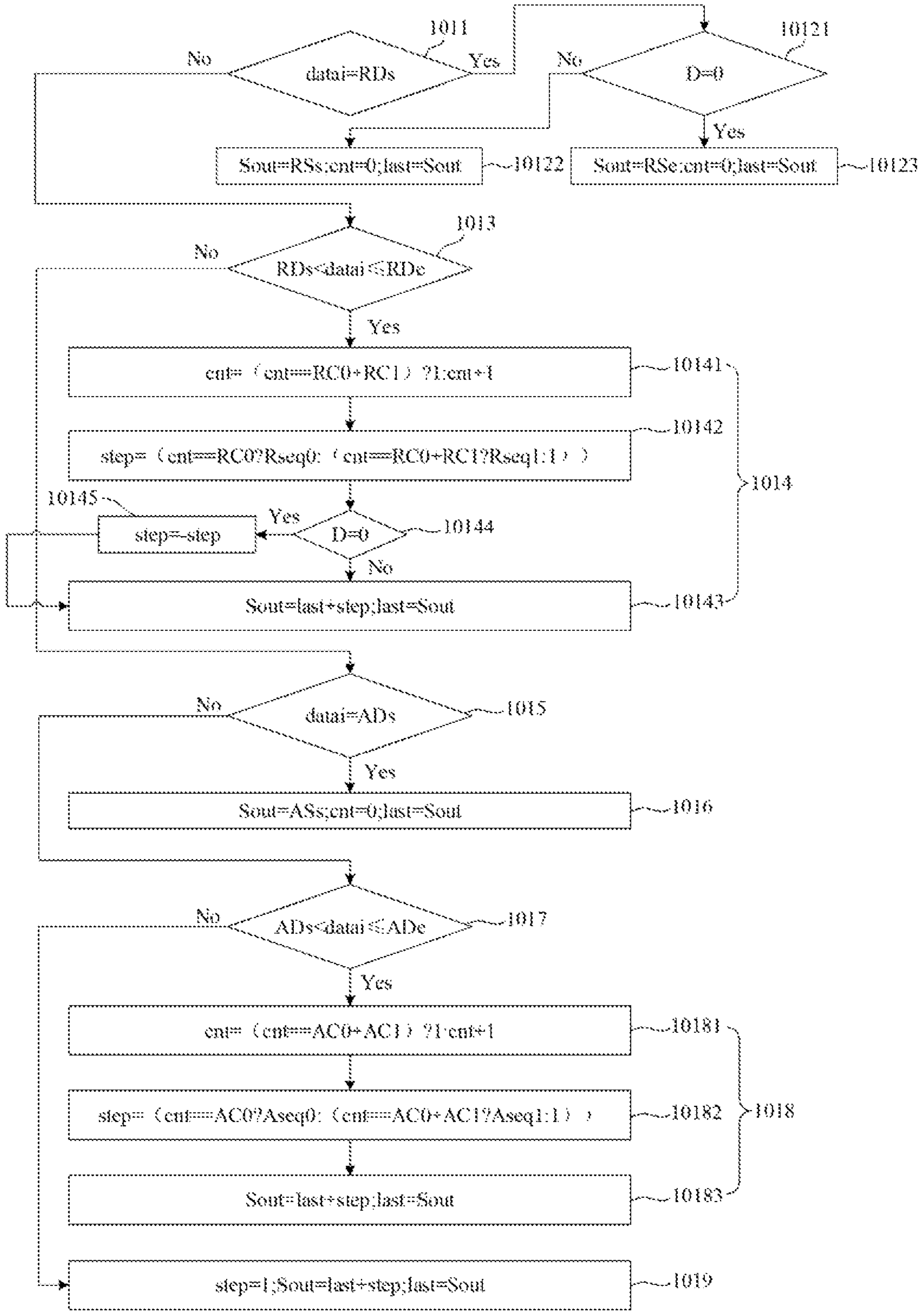
FIG. 11 is a schematic flow chat of another pseudo codes for determining a serial number of a data pin corresponding to a channel data according to embodiments of the present disclosure.

As shown in FIG. 11, the step of determining whether the serial number of the data line corresponding to the current channel datum is the starting serial number of the first predetermined, and when the serial number of the data line corresponding to the current channel datum is the starting serial number, determining that one of the starting serial number and the ending serial number of the first mapping range is the serial number of the data pin corresponding to the current channel datum includes the following steps.

When it is determined in the step 1011 that the serial number of the data line corresponding to the current channel datum is the starting serial number RDs of the first predetermined serial number range and it is determined in the step 10121 that the arrangement direction identifier is positive (D is not equal to 0, that is D=1), step 10122 is performed, the starting serial number RSs of the first mapping range is taken as the serial number of the data pin corresponding to the current channel datum.

When it is determined in the step 1011 that the serial number of the data line corresponding to the current channel datum is the starting serial number RDs of the first predetermined serial number range and it is determined in the step 10121 that the arrangement direction identifier is negative (D is equal to 0, that is D is not 1), the ending serial number RSe of the first mapping range is taken as the serial number of the data pin corresponding to the current channel datum.

When it is determined in the step 1013 that the serial number of the data line corresponding to the current channel datum is one of the non-starting serial numbers (RDs, RDe] of the first predetermined serial number range and it is determined in step 10144 that the arrangement direction identifier is negative (D=0), step 1043 is performed after the current serial number step is determined according to the current counting value in step 10142. Before mapping the sum of the serial number of the data pin corresponding to the previous channel datum and the current serial number step as the serial number of the data pin corresponding to the current channel datum, the method further includes step 10145. In step 10145, the current serial number step STEP is turned to be negative, that is STEP=−STEP, and then step 10143 is performed.

When it is determined in step 1013 that the serial number of the data line corresponding to the current channel datum is one of the non-starting serial numbers (RDs, RDe] of the first predetermined serial number range and it is determined in step 10144 that the arrangement direction identifier is positive (D is not equal to 0), step 10143 is performed.

In the embodiment shown in FIG. 4, M=1, each repeating unit 30 includes RC0 first data pins, AC0 second data pins, RC1 first data pins, AC1 second data pins, RC2 first data pins, AC2 second data pins, RC3 first data pins, and AC3 second data pins. For example, the repeating unit 30 includes one first data pin 11 (the first-data-pin group 0), three second data pins 12 (the second-data-pin group 0), one first data pin 11 (the first-data-pin group 1), and two second data pins 12 (the second-data-pin group 1) that are sequentially arranged. In some other embodiments, M may be other values. That is, the repeating unit 30 may include less groups of data pins or more groups of data pins, and thus the repeating unit 30 is compatible to more data line connection logics. The method of the embodiments of the present disclosure can be applied in various kinds of data line connection logics to determine the serial numbers of the data pins corresponding to the channel data.

Figure 12:
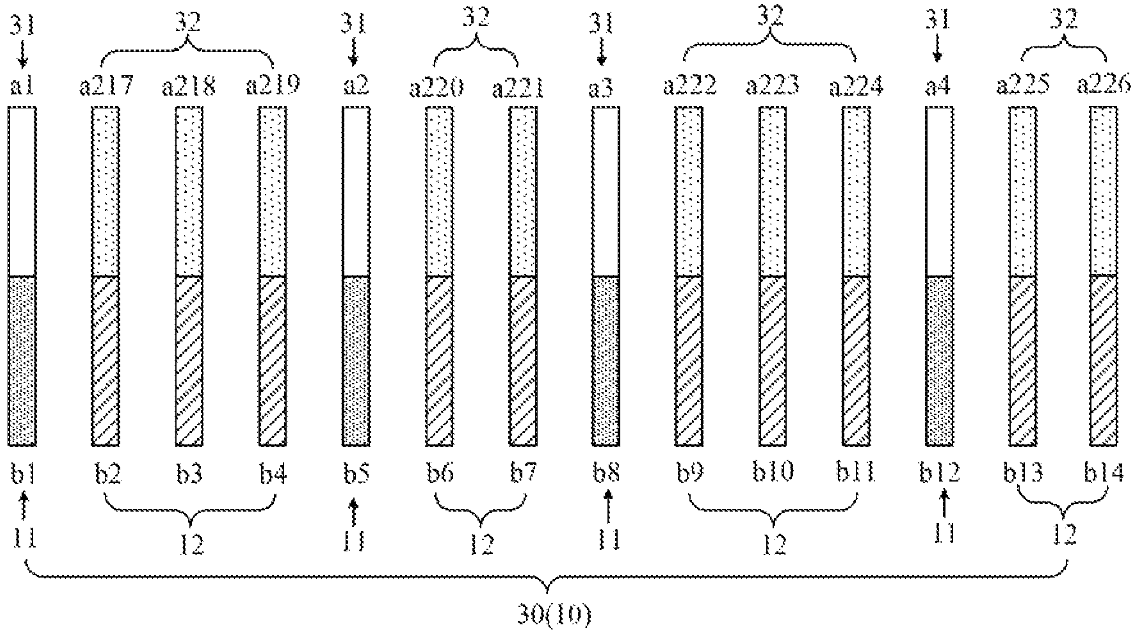
FIG. 12 is a schematic diagram showing a connection relationship of data lines and data pins in another partial region in FIG. 2.

For example, as shown in FIG. 12, the repeating unit 30 includes: one first data pin 11, three second data pins 12, one first data pin 11, two second data pins 12, one first data pin 11, three second data pins 12, one first data pin 11, and two second data pins 12 that are sequentially arranged. The data characteristics corresponding to the structure shown in FIG. 12 is illustrated in table 2.

TABLE 2

| | | | |
|---|---|---|---|
| RDs | 1 | RSs | 1 |
| RDe | 216 | RSe | 754 |
| ADs | 217 | ASs | 2 |
| ADe | 755 | ASe | 755 |
| RC0 | 1 | AC0 | 3 |
| RC1 | 1 | AC1 | 2 |
| RC2 | 1 | AC2 | 3 |
| RC3 | 1 | AC3 | 2 |
| Rseq0 | 4 | Aseq0 | 2 |
| Rseq1 | 3 | Aseq1 | 2 |
| Rseq2 | 4 | Aseq2 | 2 |
| Rseq3 | 3 | Aseq3 | 2 |

Figure 13:
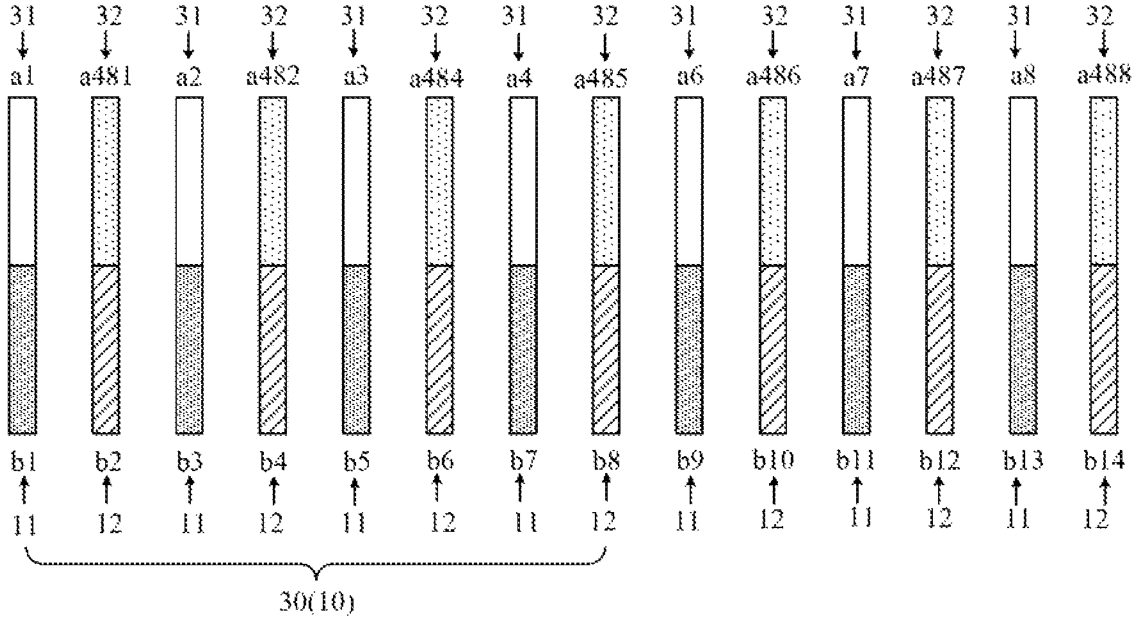
FIG. 13 is a schematic diagram showing a connection relationship of data lines and data pins in another partial region in FIG. 2.

For example, as shown in FIG. 13, the repeating unit 30 includes 8 data pins that are sequentially arranged. One second data pin 12 is arranged between any two adjacent first data pins 11, and one first data pin 11 is arranged between any two adjacent second data pins 12. The data characteristics corresponding to the structure shown in FIG. 13 is illustrated in table 3.

TABLE 3

| | | | |
|---|---|---|---|
| RDs | 1 | RSs | 1 |
| RDe | 480 | RSe | 481 |
| ADs | 481 | ASs | 2 |
| ADe | 960 | ASe | 960 |
| RC0 | 1 | AC0 | 1 |
| RC1 | 1 | AC1 | 1 |
| RC2 | 1 | AC2 | 1 |
| RC3 | 1 | AC3 | 1 |
| Rseq0 | 2 | Aseq0 | 2 |
| Rseq1 | 2 | Aseq1 | 2 |
| Rseq2 | 2 | Aseq2 | 2 |
| Rseq3 | 2 | Aseq3 | 2 |

Figure 14:
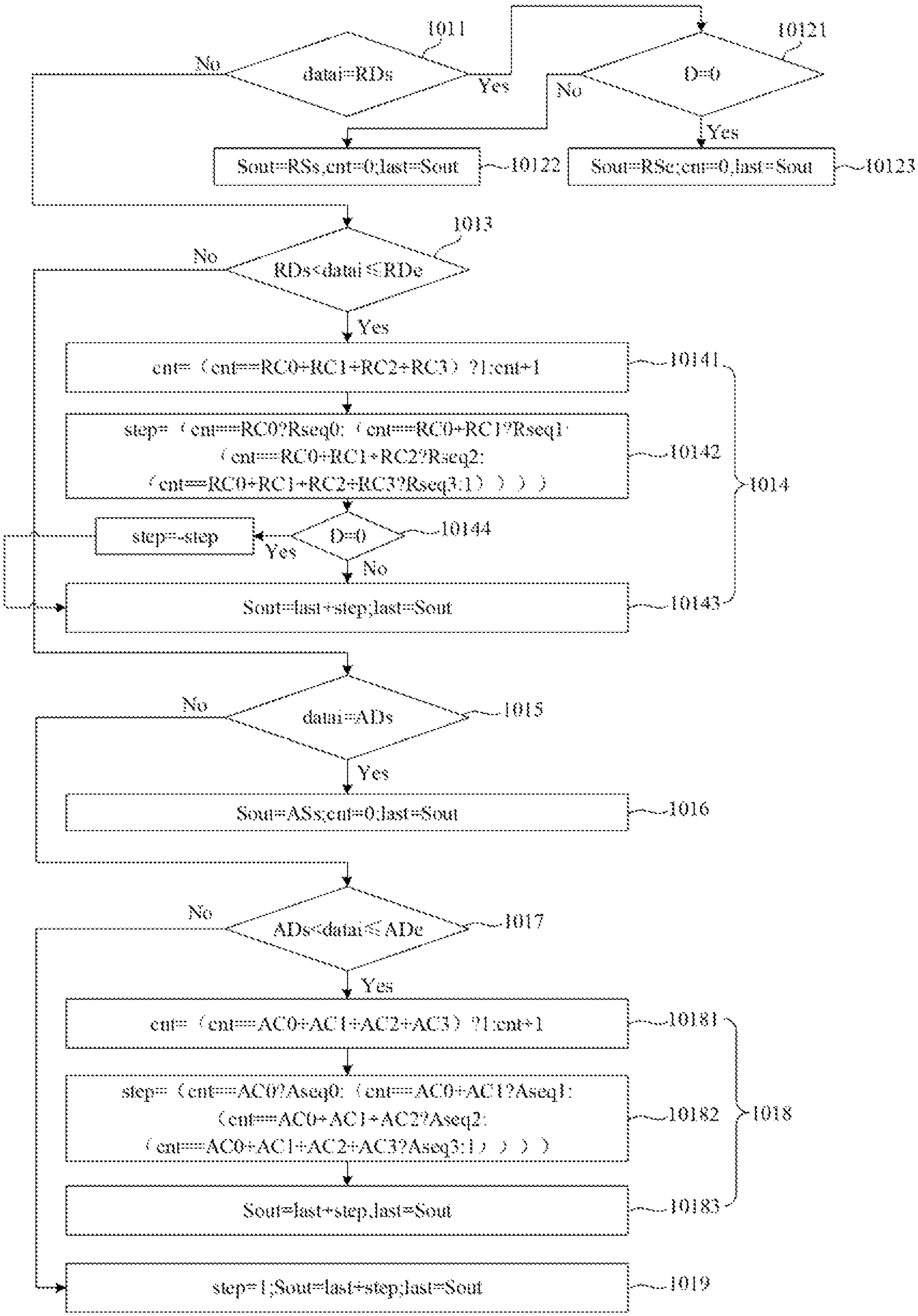
FIG. 14 is a schematic flow chat of another pseudo codes for determining a serial number of a data pin corresponding to a channel data according to embodiments of the present disclosure.

FIG. 14 is a schematic flow chart of pseudo codes of the method for transmitting data when M=3.

Figure 15:
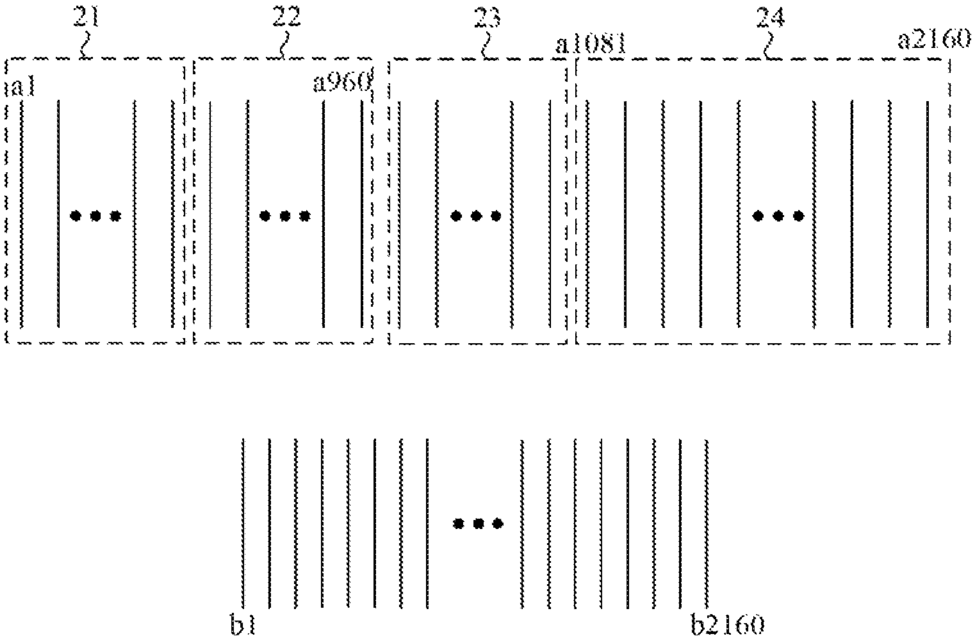
FIG. 15 is a schematic diagram showing a connection relationship of data lines and data pins in another partial region in FIG. 2.

In some embodiments, as shown in FIG. 15, the display panel includes a plurality of fourth data lines located in a fourth region 24. The plurality of fourth data lines is electrically connected to fourth data pins of the plurality of data pins, respectively. For example, the fourth data lines are data lines a1081 to a2160, the fourth data pins are data pins b1081 to b2160, the first data lines and the second data lines have a first connecting sequence with the data pins, the fourth data lines have a second connecting sequence with the data pins, and the first connecting sequence is symmetrical to the second connecting sequence. A fourth predetermined serial number range includes the serial numbers of the fourth data lines. The step of determining the serial number of the data pin corresponding to one channel datum includes: when the serial number of the data line corresponding to the current channel datum is within a fourth predetermined serial number range, acquiring a mapping value L corresponding to the current channel datum, and mapping Q−L+1 as the serial number of the data pin corresponding to the current channel datum, L being the serial number of the data pin corresponding to one channel datum of the plurality of channel data when the serial number of the data line corresponding to the channel data is Q−P+1, Q being an ending serial number of the fourth predetermined serial number range, and P being the serial number of the data line corresponding to the current channel datum.

For example, as shown in FIG. 15, the data lines a1 to a960 are connected to the data pins b1 to b960 in the first connecting sequence, the data lines a1081 to a2160 are connected to the data pins b1081 to b2160 in the second connecting sequence, and the first connecting sequence is symmetrical to the second connecting sequence. Therefore, when calculating the serial number of the data pin corresponding to the channel data data1081 corresponding to the data line a1081, P=1081, Q=2160, 2160−1081+1=1080. The serial number of the data pin corresponding to the data line a1080 calculated the above method is L. "2160−L+1" is the serial number of the data pin corresponding to the channel data data1081. For the channel data data1082, P=1082, Q=2160, 2160−1082+1=1079. The serial number of the data pin corresponding to the data line a1079 calculated the above method is L, and "2160−L+1" is the serial number of the data pin corresponding to the channel data data1080. Similarly, the serial numbers of the data pins corresponding to the channel data data1081 to data2160 are determined respectively.

Embodiments of the present disclosure further provide a data transmission apparatus. The data transmission apparatus includes a mapping module and a transmission module. The mapping module is configured to sequentially determine serial numbers of data pins corresponding to a plurality of channel data. The transmission module is configured to transmit the plurality of channel data according to the serial numbers of the data pins corresponding to the plurality of channel data. The process of determining the serial number of the data pin corresponding to one of the plurality of channel data includes: determining whether a serial number of a data line corresponding to the current channel datum is a staring serial number of a first predetermined serial number range; and when the serial number of the data line corresponding to the current channel datum is the staring serial number, mapping one of a staring serial number and an ending serial number of a first mapping range as the serial number of the data line corresponding to the current channel datum, and resetting a counting value; determining whether the serial number of the data line corresponding to the current channel datum is one of non-starting serial numbers of the first predetermined serial number range; and when the serial number of the data line corresponding to the current channel datum is one of non-starting serial numbers of the first predetermined serial number range, increasing a current counting value by 1 within a first counting range, determining a current serial number step based on the current counting value, and mapping a sum of the current serial number step and another serial number of the serial numbers of another data pin of the data pins that corresponds to a previous channel datum previous to the current channel datum as the serial number of the data pin corresponding to the current channel datum; determining whether the serial number of the data line corresponding to the current channel datum is a starting serial number of a second predetermined serial number range, when the serial number of the data line corresponding to the current channel datum is the starting serial number of the second predetermined serial number range, mapping a starting serial number of a second mapping range as the serial number of the data pin corresponding to the current channel datum, and resetting the counting value; and determining whether the serial number of the data line corresponding to the current channel datum is one of non-starting serial numbers of the second predetermined serial number range; and when the serial number of the data line corresponding to the current channel datum is one of non-starting serial numbers of the second predetermined serial number range, increasing the counting value by 1 within a second counting range, determining the current serial number step based on the current counting value, and mapping a sum of the current serial number step and the serial number of the data pin corresponding to the previous channel datum as the serial number of the data pin corresponding to the current channel datum.

The method for transmitting data in any of the above embodiment can be applied to the data transmission apparatus. The process and principle are the same as that in the above embodiments and will not be repeated herein.

It should be understood that division of the modules of the above data transmission apparatus is merely division of logical functions. In actual implementation, all or some of the modules may be integrated into one physical entity, or the modules may be physically separated. In addition, all of the modules may be implemented in a form of software invoked by using a processing element or may be implemented in a form of hardware; or some of the modules may be implemented in a form of software invoked by using a processing element, and some of the modules are implemented in a form of hardware. For example, the mapping module and the transmission module may be a processing element that is separately disposed, or may be integrated into the data transmission apparatus, for example, a chip of the data transmission apparatus. Implementations of the other modules are similar to the detection module. In addition, all or some of the modules may be integrated together or may be implemented independently. In an implementation process, steps in the foregoing methods or the foregoing modules can be implemented by using a hardware integrated logical circuit in the processing element, or by using instructions in a form of software.

For example, the mapping module and the transmission module may be configured as one or more integrated circuits for implementing the foregoing method, for example, one or more application-specific integrated circuits (ASIC), or one or more microprocessors (digital signal processor, DSP for short), or one or more field programmable gate arrays (FPGA). For another example, when one of the foregoing modules is implemented in a form of invoking program code by a processing element, the processing element may be a general-purpose processor, for example, a central processing unit (CPU) or another processor that can invoke the program code. For another example, the modules may be integrated together, and implemented in the form of a system-on-a-chip (SOC).

In some embodiments, the resetting of the counting value includes setting the current counting value to 0. The step of increasing the current counting value by 1 within the first counting range, and determining the current serial number step based on the current counting value includes: determining whether the current serial number is equal to a maximum value of the first counting range, when the current serial number is equal to the maximum value of the first counting range, setting the current counting to 1, and when the current serial number is not equal to the maximum value of the first counting range, increasing the current counting value by 1, the maximum value of the first counting range being RC0+RC1+RC2+ . . . +RCM, M being a non-negative integer, RCi being a positive integer, i=0, 1, . . . , M; and determining whether the current serial number is equal to one of values RC0, RC0+RC1, RC0+RC1+RC2+ . . . +RCM, when the current serial number is equal to one of the values RC0, RC0+RC1, . . . , RC0+RC1+RC2+ . . . +RCM, taking a gap value corresponding to a last addend of one of the value that is equal to the current counting value as the current serial number step, and when the current serial number is not equal to any one of the values RC0, RC0+RC1, . . . , RC0+RC1+RC2+ . . . +RCM, setting the current serial number step to 1, the gap value corresponding to RCi being Rseqi. The step of increasing the current counting value by 1 within the second counting range, and determining the current serial number step based on the current counting value includes: determining whether the current counting value is equal to a maximum value of the second counting value, when the current counting value is equal to the maximum value, setting the current counting value to 1, and when the current counting value is not equal to the maximum value, increasing the current counting value by 1, the maximum value of the second counting value being AC0+AC1+AC2+ . . . +ACM, ACi being a positive integer; and determining whether the current counting value is equal to one of values AC0, AC0+AC1, . . . , AC0+AC1+AC2+ . . . +ACM, when the current counting value is equal to one value of the values AC0, AC0+AC1, . . . , AC0+AC1+AC2+ . . . +ACM, mapping a gap value corresponding to a last addend of the value equal to the current counting value as the current serial number step, and when the current serial number is not equal to any one of the values AC0, AC0+AC1, . . . , AC0+AC1+AC2+ . . . +ACM, setting the current serial number step to 1, the gap value corresponding to ACi being Aseqi, Aseqi=RCi+1, and Rseqi=ACi+1.

In some embodiments, the step of determining the serial number of the data pin corresponding to the channel datum of the plurality of channel data includes: when the serial number of the data line corresponding to the current channel datum is within a third predetermined serial number range, setting the current serial number step to 1, and mapping a sum of the current serial number step and another serial number of the serial numbers of another data pin of the data pins that corresponds to a previous channel datum previous to the current channel datum as the serial number of the data pin corresponding to the current channel datum.

In some embodiments, the step of determining whether the serial number of the data line corresponding to the current channel datum is the staring serial number of the first predetermined serial number range, and when the serial number of the data line corresponding to the current channel datum is the staring serial number, determining that the one of the staring serial number and the ending serial number of the first mapping range is the serial number of the data line corresponding to the current channel datum includes: when the serial number of the data line corresponding to the current channel datum is the starting serial number of the first predetermined serial number range and an arrangement direction identifier is positive, mapping the staring serial number of the first mapping range as the serial number of the data pin corresponding to the current channel datum; when the serial number of the data line corresponding to the current channel datum is the starting serial number of the first predetermined serial number range and the arrangement direction identifier is negative, mapping the ending serial number of the first mapping range as the serial number of the data pin corresponding to the current channel datum; and when the serial number of the data line corresponding to the current channel datum is one of non-starting serial numbers of the first predetermined serial number range and the arrangement direction identifier is negative, setting the current serial number step to be negative after the determining the current serial number step based on the current counting value and before the mapping the sum of the current serial number step and the another serial number of the another data pin that corresponds to the previous channel datum previous to the current channel datum as the serial number of the data pin corresponding to the current channel datum.

In some embodiments, M=3.

In some embodiments, the step of determining the serial number of the data pin corresponding to the channel datum includes: when the serial number of the data line corresponding to the current channel datum is within a fourth predetermined serial number range, acquiring a mapping value L corresponding to the current channel datum, and mapping Q−L+1 as the serial number of the data pin corresponding to the current channel datum, L being the serial number of the data pin corresponding to one channel datum of the plurality of channel data when the serial number of the data line corresponding to the channel data is Q−P+1, Q being an ending serial number of the fourth predetermined serial number range, and P being the serial number of the data line corresponding to the current channel datum.

Embodiments of the present disclosure further provide a non-transitory computer-readable medium. The non-transitory computer-readable medium includes computer instructions, when the computer instructions are run on an electronic device, the computer instructions cause the electronic device to perform the method for transmitting data in any above embodiment.

All or some of foregoing embodiments may be implemented by using software, hardware, firmware, or any combination thereof. When software is used to implement embodiments, some or all of embodiments may be implemented in a form of a computer program product. The computer program product includes one or more computer instructions. When the computer program instructions are loaded and executed on the computer, some or all of the procedures or functions in this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid-state disk), or the like.

In embodiments of the present disclosure, “at least one” means one or more, and “a plurality of” means two or more. The term “and/or” describes an association relationship for describing associated objects and represents that three relationships may exist. For example, A and/or B may represent the following three cases: A alone, both A and B, and B alone. A and B may be in a singular or plural form. The character “/” usually indicates an “or” relationship between associated objects. “At least one of the following items (pieces)” or a similar expression thereof indicates any combination of these items, including a single item (piece) or any combination of a plurality of items (pieces). For example, at least one of a, b, and c may represent a, b, c, a-b, a-c, b-c, or a-b-c, where a, b, and c may be in a single or plural form.

The above are only exemplary embodiments of the present disclosure and are not intended to limit the present disclosure. Any modifications, equivalent replacements, improvements, and the like made within the principle of the present disclosure are intended to be included within the protection scope of the present disclosure.

I claim:

1. A method for transmitting data, comprising:

sequentially determining serial numbers of data pins corresponding to a plurality of channel data; and transmitting the plurality of channel data based on the serial numbers of the data pins corresponding to the plurality of channel data, wherein determining one serial number of the serial numbers of one data pin of the data pins corresponding to a current channel datum of the plurality of channel data comprises:

determining whether a serial number of a data line corresponding to the current channel datum is a staring serial number of a first predetermined serial number range; and when the serial number of the data line corresponding to the current channel datum is the staring serial number, mapping one of a staring serial number and an ending serial number of a first mapping range as the serial number of the data line corresponding to the current channel datum, and resetting a counting value;

determining whether the serial number of the data line corresponding to the current channel datum is one of non-starting serial numbers of the first predetermined serial number range; and when the serial number of the data line corresponding to the current channel datum is not the starting serial number of the first predetermined serial number range, increasing a current counting value by 1 within a first counting range, determining a current serial number step based on the current counting value, and mapping a sum of the current serial number step and another serial number of the serial numbers of another data pin of the data pins that corresponds to a previous channel datum previous to the current channel datum as the serial number of the data pin corresponding to the current channel datum;

determining whether the serial number of the data line corresponding to the current channel datum is a starting serial number of a second predetermined serial number range, when the serial number of the data line corresponding to the current channel datum is the starting serial number of the second predetermined serial number range, mapping a starting serial number of a second mapping range as the serial number of the data pin corresponding to the current channel datum, and resetting the counting value; and determining whether the serial number of the data line corresponding to the current channel datum is one of non-starting serial numbers of the second predetermined serial number range; and when the serial number of the data line corresponding to the current channel datum is one of the non-starting serial number of the second predetermined serial number range, increasing the counting value by 1 within a second counting range, determining the current serial number step based on the current counting value, and mapping a sum of the current serial number step and the serial number of the data pin corresponding to the previous channel datum as the serial number of the data pin corresponding to the current channel datum.

2. The method for transmitting data according to claim 1, wherein said resetting the counting value comprises setting the current counting value to 0, wherein said increasing the current counting value by 1 within the first counting range, and determining the current serial number step based on the current counting value comprises:

determining whether the current serial number is equal to a maximum value of the first counting range, when the current serial number is equal to the maximum value of the first counting range, setting the current counting to 1, and when the current serial number is not equal to the maximum value of the first counting range, increasing the current counting value by 1, the maximum value of the first counting range being RC0+RC1+RC2+ . . . +RCM, M being a non-negative integer, RCi being a positive integer, i=0 to M; and determining whether the current serial number is equal to one of values RC0, RC0+RC1, . . . , RC0+RC1+RC2+ . . . +RCM, when the current serial number is equal to one of the values RC0, RC0+RC1, . . . , RC0+RC1+RC2+ . . . +RCM, taking a gap value corresponding to a last addend of one of the value that is equal to the current counting value as the current serial number step, and when the current serial number is not equal to any one of the values RC0, RC0+RC1, . . . , RC0+RC1+RC2+ . . . +RCM, setting the current serial number step to 1, the gap value corresponding to RCi being Rseqi, and wherein said increasing the current counting value by 1 within the second counting range, and determining the current serial number step based on the current counting value comprises:

determining whether the current counting value is equal to a maximum value of the second counting value, when the current counting value is equal to the maximum value, setting the current counting value to 1, and when the current counting value is not equal to the maximum value, increasing the current counting value by 1, the maximum value of the second counting value being AC0+AC1+AC2+ . . . +ACM, ACi being a positive integer; and determining whether the current counting value is equal to one of values AC0, AC0+AC1, . . . , AC0+AC1+AC2+ . . . +ACM, when the current counting value is equal to one value of the values AC0, AC0+AC1, . . . , AC0+AC1+AC2+ . . . +ACM, mapping a gap value corresponding to a last addend of the value equal to the current counting value as the current serial number step, and when the current serial number is not equal to any one of the values AC0, AC0+AC1, . . . , AC0+AC1+AC2+ . . . +ACM, setting the current serial number step to 1, the gap value corresponding to ACi being Aseqi, Aseqi=RCi+1, and Rseqi=ACi+1.

3. The method for transmitting data according to claim 2, wherein M=3.

4. The method for transmitting data according to claim 1, wherein said determining the serial number of the data pin corresponding to the channel datum of the plurality of channel data further comprises:

when the serial number of the data line corresponding to the current channel datum is within a third predetermined serial number range, setting the current serial number step to 1, and mapping a sum of the current serial number step and another serial number of the serial numbers of another data pin of the data pins that corresponds to a previous channel datum previous to the current channel datum as the serial number of the data pin corresponding to the current channel datum.

5. The method for transmitting data according to claim 1, wherein said determining whether the serial number of the data line corresponding to the current channel datum is the staring serial number of the first predetermined serial number range, and when the serial number of the data line corresponding to the current channel datum is the staring serial number, determining that the one of the staring serial number and the ending serial number of the first mapping range is the serial number of the data line corresponding to the current channel datum comprises:

when the serial number of the data line corresponding to the current channel datum is the starting serial number of the first predetermined serial number range and an arrangement direction identifier is positive, mapping the staring serial number of the first mapping range as the serial number of the data pin corresponding to the current channel datum;

when the serial number of the data line corresponding to the current channel datum is the starting serial number of the first predetermined serial number range and the arrangement direction identifier is negative, mapping the ending serial number of the first mapping range as the serial number of the data pin corresponding to the current channel datum; and when the serial number of the data line corresponding to the current channel datum is one of the non-starting serial numbers of the first predetermined serial number range and the arrangement direction identifier is negative, setting the current serial number step to be negative after said determining the current serial number step based on the current counting value and before said mapping the sum of the current serial number step and the another serial number of the another data pin that corresponds to the previous channel datum previous to the current channel datum as the serial number of the data pin corresponding to the current channel datum.

6. The method for transmitting data according to claim 1, wherein said determining the serial number of the data pin corresponding to channel datum of the plurality of channel data further comprises:

when the serial number of the data line corresponding to the current channel datum is within a fourth predetermined serial number range, acquiring a mapping value L corresponding to the current channel datum, and mapping Q−L+1 as the serial number of the data pin corresponding to the current channel datum, L being the serial number of the data pin corresponding to one channel datum of the plurality of channel data when the serial number of the data line corresponding to the channel data is Q−P+1, Q being an ending serial number of the fourth predetermined serial number range, and P being the serial number of the data line corresponding to the current channel datum.

7. An electronic device comprising:

a processor comprising data pins sequentially arranged;

a memory, wherein the memory is configured to store at least one instruction, wherein the at least one instruction, when loaded and executed by the processor, causes the processor to perform a method for transmitting data; and a display panel, wherein the display panel comprises a plurality of first data lines sequentially arranged in a first region and a plurality of second data lines sequentially arranged in a second region, wherein the plurality of first data lines is connected to a plurality of first data pins of the data pins, respectively, the plurality of second data lines is connected to a plurality of second data pins of the data pins, respectively, and the plurality of first data pins is alternately arranged with the plurality of second data pins, wherein a starting serial number and an ending serial number of the plurality of first data lines are a staring serial number and an ending serial number of a first predetermined serial number range, respectively, a starting serial number and an ending serial number of the plurality of second data lines are a staring serial number and an ending serial number of a second predetermined serial number range, respectively, a starting serial number and an ending serial number of the plurality of first data pins are a staring serial number and an ending serial number of a first mapping range, and a starting serial number and an ending serial number of the plurality of second data pins are a staring serial number and an ending serial number of a second mapping range, respectively, wherein the method for transmitting data comprises:

sequentially determining serial numbers of data pins corresponding to a plurality of channel data; and transmitting the plurality of channel data based on the serial numbers of the data pins corresponding to the plurality of channel data, wherein determining one serial number of the serial numbers of one data pin of the data pins corresponding to a current channel datum of the plurality of channel data comprises:

determining whether a serial number of a data line corresponding to the current channel datum is a staring serial number of a first predetermined serial number range; and when the serial number of the data line corresponding to the current channel datum is the staring serial number, mapping one of a staring serial number and an ending serial number of a first mapping range as the serial number of the data line corresponding to the current channel datum, and resetting a counting value;

determining whether the serial number of the data line corresponding to the current channel datum is not the starting serial number of the first predetermined serial number range; and when the serial number of the data line corresponding to the current channel datum is not the starting serial number of the first predetermined serial number range, increasing a current counting value by 1 within a first counting range, determining a current serial number step based on the current counting value, and mapping a sum of the current serial number step and another serial number of the serial numbers of another data pin of the data pins that corresponds to a previous channel datum previous to the current channel datum as the serial number of the data pin corresponding to the current channel datum;

determining whether the serial number of the data line corresponding to the current channel datum is a starting serial number of a second predetermined serial number range, when the serial number of the data line corresponding to the current channel datum is the starting serial number of the second predetermined serial number range, mapping a starting serial number of a second mapping range as the serial number of the data pin corresponding to the current channel datum, and resetting the counting value; and determining whether the serial number of the data line corresponding to the current channel datum is not the starting serial number of the second predetermined serial number range; and when the serial number of the data line corresponding to the current channel datum is not the starting serial number of the second predetermined serial number range, increasing the counting value by 1 within a second counting range, determining the current serial number step based on the current counting value, and mapping a sum of the current serial number step and the serial number of the data pin corresponding to the previous channel datum as the serial number of the data pin corresponding to the current channel datum.

8. The electronic device according to claim 7, wherein the plurality of first data pins and the plurality of second data pins define a plurality of repeating units sequentially arranged, wherein each of the plurality of repeating units comprises: RC0 first data pins of the plurality of first data lines, AC0 second data pins of the plurality of second data lines, RC1 first data pins of the plurality of first data lines, AC1 second data pins of the plurality of second data lines, RC2 first data pins of the plurality of first data lines, AC2 second data pins of the plurality of second data lines, . . . , RCM first data pins of the plurality of first data lines, and ACM second data pins of the plurality of second data lines that are sequentially arranged, M being a non-negative integer, wherein said resetting the counting value comprises setting the counting value to 0, wherein said increasing the current counting value by 1 within the first counting range, and determining the current serial number step based on the current counting value comprises:

determining whether the current serial number is equal to a maximum value of the first counting range, when the current serial number is equal to the maximum value of the first counting range, setting the current counting to 1, and when the current serial number is not equal to the maximum value of the first counting range, increasing the current counting value by 1, the maximum value of the first counting range being RC0+RC1+RC2+ . . . +RCM, M being a non-negative integer, RCi being a positive integer, and i=0 to M; and determining whether the current serial number is equal to one of values RC0, RC0+RC1, . . . , RC0+RC1+RC2+ . . . +RCM, when the current serial number is equal to one of the values RC0, RC0+RC1, . . . , RC0+RC1+RC2+ . . . +RCM, mapping a gap value corresponding to a last addend of one of the values RC0, RC0+RC1, . . . , RC0+RC1+RC2+ . . . +RCM that is equal to the current counting value as the current serial number step, and when the current serial number is not equal to any one of the values RC0, RC0+RC1, . . . , RC0+RC1+RC2+ . . . +RCM, setting the current serial number step to 1, the gap value corresponding to RCi being Rseqi, wherein said increasing the current counting value by 1 within the second counting range, and determining the current serial number step based on the current counting value comprises:

determining whether the current counting value is equal to a maximum value of the second counting value, when the current counting value is equal to the maximum value, setting the current counting value to 1, and when the current counting value is not equal to the maximum value, increasing the current counting value by 1, the maximum value of the second counting value being AC0+AC1+AC2+ . . . +ACM, ACi being a positive integer; and determining whether the current counting value is equal to one of values AC0, AC0+AC1, . . . , AC0+AC1+AC2+ . . . +ACM, when the current counting value is equal to one value of the values AC0, AC0+AC1, . . . , AC0+AC1+AC2+ . . . +ACM, mapping a gap value corresponding to a last addend of the value equal to the current counting value as the current serial number step, and when the current serial number is not equal to any one of the values AC0, AC0+AC1, . . . , AC0+AC1+AC2+ . . . +ACM, setting the current serial number step to 1, the gap value corresponding to ACi being Aseqi, Aseqi=RCi+1, and Rseqi=ACi+1.

9. The electronic device according to claim 8, wherein M=3, each of the plurality of repeating units comprises RC0 first data pins of the plurality of first data lines, AC0 second data pins of the plurality of second data lines, RC1 first data pins of the plurality of first data lines, AC1 second data pins of the plurality of second data lines, RC2 first data pins of the plurality of first data lines, AC2 second data pins of the plurality of second data lines, RC3 first data pins of the plurality of first data lines, and AC3 second data pins of the plurality of second data lines.

10. The electronic device according to claim 7, wherein the display panel comprises a plurality of third data lines sequentially arranged in a third region and connected to a plurality of third data pins of the data pins, respectively, wherein a starting serial number and an ending serial number of the plurality of third data lines are a starting serial number and an ending serial number of a third predetermined serial number range, respectively, wherein the first region, the second region, and the third region are sequentially arranged on the display panel, and wherein said determining the serial number of the data pin corresponding to the current channel datum of the plurality of channel data further comprises:

when the serial number of the data line corresponding to the current channel datum is within a third predetermined serial number range, setting the current serial number step to 1, and mapping a sum of the current serial number step and another serial number of the serial numbers of another data pin of the data pins that corresponds to a previous channel datum previous to the current channel datum as the serial number of the data pin corresponding to the current channel datum.

11. The electronic device according to claim 7, wherein when the plurality of first data lines is connected to the plurality of first data pins in a serial-number-increasing manner, an arrangement direction identifier is positive, and when the plurality of first data lines is connected to the plurality of first data pins in a serial-number-decreasing manner, the arrangement direction identifier is negative; and wherein said determining whether the serial number of the data line corresponding to the current channel datum is the staring serial number of the first predetermined serial number range, and when the serial number of the data line corresponding to the current channel datum is the staring serial number, determining that the one of the staring serial number and the ending serial number of the first mapping range is the serial number of the data line corresponding to the current channel datum comprises:

when the serial number of the data line corresponding to the current channel datum is the starting serial number of the first predetermined serial number range and an arrangement direction identifier is positive, mapping the staring serial number of the first mapping range as the serial number of the data pin corresponding to the current channel datum, when the serial number of the data line corresponding to the current channel datum is the starting serial number of the first predetermined serial number range and the arrangement direction identifier is negative, mapping the ending serial number of the first mapping range as the serial number of the data pin corresponding to the current channel datum, and when the serial number of the data line corresponding to the current channel datum is one of non-starting serial numbers of the first predetermined serial number range and the arrangement direction identifier is negative, setting the current serial number step to be negative after said determining the current serial number step based on the current counting value and before said mapping the sum of the current serial number step and the another serial number of the another data pin that corresponds to the previous channel datum previous to the current channel datum as the serial number of the data pin corresponding to the current channel datum.

12. The electronic device according to claim 7, wherein said determining the serial number of the data pin corresponding to current channel datum of the plurality of channel data further comprises:

when the serial number of the data line corresponding to the current channel datum is within a fourth predetermined serial number range, acquiring a mapping value L corresponding to the current channel datum, mapping Q−L+1 as the serial number of the data pin corresponding to the current channel datum, L being the serial number of the data pin corresponding to one channel datum of the plurality of channel data when the serial number of the data line corresponding to the channel data is Q−P+1, Q being an ending serial number of the fourth predetermined serial number range, and P being the serial number of the data line corresponding to the current channel datum;

wherein the display panel comprises a plurality of fourth data lines sequentially arranged in a fourth region and connected to a plurality of fourth data pins of the data pins, respectively, wherein the plurality of first data lines and the plurality of second data lines are connected to the plurality of first data pins and the plurality of second data pins in a first connecting sequence, the plurality of fourth data lines is connected to the plurality of fourth data pins in a second connecting sequence, the first connecting sequence is symmetrical to the second connecting sequence, and at least two serial numbers of the plurality of fourth data pins are within the fourth predetermined serial number range.

13. A non-transitory computer-readable medium comprising computer instructions, wherein when the computer instructions are run on an electronic device, the computer instructions cause the electronic device to perform a method for transmitting data, wherein the method for transmitting data comprises:

sequentially determining serial numbers of data pins corresponding to a plurality of channel data; and transmitting the plurality of channel data based on the serial numbers of the data pins corresponding to the plurality of channel data, wherein determining one serial number of the serial numbers of one data pin of the data pins corresponding to a current channel datum of the plurality of channel data comprises:

determining whether a serial number of a data line corresponding to the current channel datum is a staring serial number of a first predetermined serial number range; and when the serial number of the data line corresponding to the current channel datum is the staring serial number, mapping one of a staring serial number and an ending serial number of a first mapping range as the serial number of the data line corresponding to the current channel datum, and resetting a counting value;

determining whether the serial number of the data line corresponding to the current channel datum is one of non-starting serial numbers of the first predetermined serial number range; and when the serial number of the data line corresponding to the current channel datum is not the starting serial number of the first predetermined serial number range, increasing a current counting value by 1 within a first counting range, determining a current serial number step based on the current counting value, and mapping a sum of the current serial number step and another serial number of the serial numbers of another data pin of the data pins that corresponds to a previous channel datum previous to the current channel datum as the serial number of the data pin corresponding to the current channel datum;

determining whether the serial number of the data line corresponding to the current channel datum is a starting serial number of a second predetermined serial number range, when the serial number of the data line corresponding to the current channel datum is the starting serial number of the second predetermined serial number range, mapping a starting serial number of a second mapping range as the serial number of the data pin corresponding to the current channel datum, and resetting the counting value; and determining whether the serial number of the data line corresponding to the current channel datum is one of non-starting serial numbers of the second predetermined serial number range; and when the serial number of the data line corresponding to the current channel datum is not the starting serial number of the second predetermined serial number range, increasing the counting value by 1 within a second counting range, determining the current serial number step based on the current counting value, and mapping a sum of the current serial number step and the serial number of the data pin corresponding to the previous channel datum as the serial number of the data pin corresponding to the current channel datum.

14. The non-transitory computer-readable medium according to claim 13, wherein said resetting the counting value comprises setting the current counting value to 0, wherein said increasing the current counting value by 1 within the first counting range, and determining the current serial number step based on the current counting value comprises:

determining whether the current serial number is equal to a maximum value of the first counting range, when the current serial number is equal to the maximum value of the first counting range, setting the current counting to 1, and when the current serial number is not equal to the maximum value of the first counting range, increasing the current counting value by 1, the maximum value of the first counting range being RC0+RC1+RC2+ . . . +RCM, M being a non-negative integer, RCi being a positive integer, i=0, 1, . . . , M; and determining whether the current serial number is equal to one of values RC0, RC0+RC1, . . . , RC0+RC1+RC2+ . . . +RCM, when the current serial number is equal to one of the values RC0, RC0+RC1, . . . , RC0+RC1+RC2+ . . . +RCM, taking a gap value corresponding to a last addend of one of the value that is equal to the current counting value as the current serial number step, and when the current serial number is not equal to any one of the values RC0, RC0+RC1, . . . , RC0+RC1+RC2+ . . . +RCM, setting the current serial number step to 1, the gap value corresponding to RCi being Rseqi, and wherein said increasing the current counting value by 1 within the second counting range, and determining the current serial number step based on the current counting value comprises:

determining whether the current counting value is equal to a maximum value of the second counting value, when the current counting value is equal to the maximum value, setting the current counting value to 1, and when the current counting value is not equal to the maximum value, increasing the current counting value by 1, the maximum value of the second counting value being AC0+AC1+AC2+ . . . +ACM, ACi being a positive integer; and determining whether the current counting value is equal to one of values AC0, AC0+AC1, . . . , AC0+AC1+AC2+ . . . +ACM, when the current counting value is equal to one value of the values AC0, AC0+AC1, . . . , AC0+AC1+AC2+ . . . +ACM, mapping a gap value corresponding to a last addend of the value equal to the current counting value as the current serial number step, and when the current serial number is not equal to any one of the values AC0, AC0+AC1, . . . , AC0+AC1+AC2+ . . . +ACM, setting the current serial number step to 1, the gap value corresponding to ACi being Aseqi, Aseqi=RCi+1, and Rseqi=ACi+1.

15. The non-transitory computer-readable medium according to claim 14, wherein M=3.

16. The non-transitory computer-readable medium according to claim 13, wherein said determining the serial number of the data pin corresponding to the current channel datum of the plurality of channel data further comprises:

when the serial number of the data line corresponding to the current channel datum is within a third predetermined serial number range, setting the current serial number step to 1, and mapping a sum of the current serial number step and another serial number of the serial numbers of another data pin of the data pins that corresponds to a previous channel datum previous to the current channel datum as the serial number of the data pin corresponding to the current channel datum.

17. The non-transitory computer-readable medium according to claim 13, wherein said determining whether the serial number of the data line corresponding to the current channel datum is the staring serial number of the first predetermined serial number range, and when the serial number of the data line corresponding to the current channel datum is the staring serial number, determining that the one of the staring serial number and the ending serial number of the first mapping range is the serial number of the data line corresponding to the current channel datum comprises:

when the serial number of the data line corresponding to the current channel datum is the starting serial number of the first predetermined serial number range and an arrangement direction identifier is positive, mapping the staring serial number of the first mapping range as the serial number of the data pin corresponding to the current channel datum;

when the serial number of the data line corresponding to the current channel datum is the starting serial number of the first predetermined serial number range and the arrangement direction identifier is negative, mapping the ending serial number of the first mapping range as the serial number of the data pin corresponding to the current channel datum; and when the serial number of the data line corresponding to the current channel datum is one of non-starting serial numbers of the first predetermined serial number range and the arrangement direction identifier is negative, setting the current serial number step to be negative after said determining the current serial number step based on the current counting value and before said mapping the sum of the current serial number step and the another serial number of the another data pin that corresponds to the previous channel datum previous to the current channel datum as the serial number of the data pin corresponding to the current channel datum.

18. The non-transitory computer-readable medium according to claim 13, wherein said determining the serial number of the data pin corresponding to current channel datum of the plurality of channel data further comprises:

when the serial number of the data line corresponding to the current channel datum is within a fourth predetermined serial number range, acquiring a mapping value L corresponding to the current channel datum, mapping Q−L+1 as the serial number of the data pin corresponding to the current channel datum, L being the serial number of the data pin corresponding to one channel datum of the plurality of channel data when the serial number of the data line corresponding to the channel data is Q−P+1, Q being an ending serial number of the fourth predetermined serial number range, and P being the serial number of the data line corresponding to the current channel datum.

* * * * *